(12) United States Patent
Yu et al.

(10) Patent No.: US 7,912,090 B2
(45) Date of Patent: *Mar. 22, 2011

(54) BI-LEVEL AND FULL-COLOR VIDEO COMBINATION FOR VIDEO COMMUNICATION

(75) Inventors: Keman Yu, Beijing (CN); Jiang Li, Beijing (CN); Shipeng Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 450 days.

This patent is subject to a terminal disclaimer.

(21) Appl. No.: 12/100,744

(22) Filed: Apr. 10, 2008

(65) Prior Publication Data

US 2009/0284650 A1   Nov. 19, 2009

Related U.S. Application Data

(63) Continuation of application No. 10/445,310, filed on May 23, 2003, now Pat. No. 7,359,004.

(51) Int. Cl.
*H04L 12/56* (2006.01)
*H04J 1/16* (2006.01)
(52) U.S. Cl. .......... 370/477; 370/252; 370/419
(58) Field of Classification Search ......... 370/252, 370/419, 477
See application file for complete search history.

(56) References Cited

U.S. PATENT DOCUMENTS

| | | | |
|---|---|---|---|
| 5,847,760 A | 12/1998 | Elmaliach et al. | |
| 6,111,896 A | 8/2000 | Slattery et al. | |
| 6,236,759 B1 | 5/2001 | Horie et al. | |
| 6,265,997 B1 | 7/2001 | Nomizu | |
| 6,600,428 B1 * | 7/2003 | O'Toole et al. | 340/825.36 |
| 7,085,268 B2 | 8/2006 | Fukuda et al. | |
| 7,099,954 B2 | 8/2006 | Li et al. | |
| 7,729,268 B2 * | 6/2010 | Matta et al. | 370/252 |
| 2002/0006225 A1 | 1/2002 | Kimura et al. | |
| 2002/0044528 A1 | 4/2002 | Pogrebinsky et al. | |
| 2002/0087761 A1 | 7/2002 | Clapp et al. | |
| 2004/0013311 A1 | 1/2004 | Hirao | |
| 2004/0252893 A1 | 12/2004 | Togashi | |
| 2004/0264377 A1 | 12/2004 | Kilkki et al. | |

OTHER PUBLICATIONS

Li, et al., "Portrait Video Phone", ACM, 2001, pp. 1-2.

* cited by examiner

*Primary Examiner* — John Pezzlo
(74) *Attorney, Agent, or Firm* — Lee & Hayes, PLLC

(57) ABSTRACT

Systems and methods for video communication are described. In one aspect, network bandwidth conditions are estimated. Bi-level or full-color video is then transmitted over the network at transmission bit rates that are controlled as a function of the estimated bandwidth conditions. To this end, network bandwidth capability is periodically probed to identify similar, additional, or decreased bandwidth capabilities as compared to the estimated bandwidth conditions. Decisions to hold, decrease, or increase the video transmission bit rate are made based on the estimated bandwidth conditions in view of the probing operations. When the transmission bit rate is increased or decreased, the transmission bit rate is calculated to target an upper or lower bit rate, both of which are indicated by the estimated bandwidth conditions. Bi-level video communication is switched to full-color video transmission, or vice versa, when the video transmission bit rate respectively reaches the upper bit rate or the lower bit rate.

26 Claims, 26 Drawing Sheets

BI-LEVEL AND FULL-COLOR VIDEO COMBINATION FOR VIDEO COMMUNICATION

RELATED APPLICATIONS

This application is a continuation of and claims priority to U.S. patent application Ser. No. 10/445,310, filed on May 23, 2003, now U.S. Pat. No. 7,359,004, the disclosure of which is incorporated by reference herein. This application is related to U.S. patent application Ser. No. 09/844,549, filed on Apr. 28, 2001, titled "A System and Process for Broadcast and Communication with Very Low Bit rate Bi-Level or Sketch Video", now U.S. Pat. No. 6,888,893, commonly assigned to the assignee of this application, and hereby incorporated by reference.

TECHNICAL FIELD

The invention pertains to adaptive video communication.

BACKGROUND

Ubiquitous video communication is commonly agreed to be an ultimate goal of modern communication services. Yet, even in view of rapid advances and deployment of computing technology and the relative ease and dearth of computing device interconnectivity opportunities, video communication is still not very common. In part, this is because of the lack of a video codec (encoder/decoder) that can produce and present high quality video across the substantially large range of network bandwidths that are utilized by many of the available communication devices (e.g., handheld PCs, personal digital assistants (PDAs), mobile phones, laptops, desktops, etc.).

For example, even though popular video compression technologies such as Moving Pictures Expert Group (MPEG) and H.263 compression techniques have been used for quite some time, these compression techniques still do not provide satisfactory and smooth video frame encoding and transmission at currently popular bandwidth ranges, for instance, at 33.6 Kbps or below. Rather, in low bandwidth conditions (e.g., below 33.6 Kbps), such conventional techniques typically result in images that look like an ill-fitted collection of a limited selection of color blocks, and wherein scene motion is abnormally discontinuous. Such undesirable ill-fitted collections of color blocks is determined to originate from the common discrete cosine transform (DCT) based coding architecture of the MPEG, MPEG2, MPEG4 and H.263 coding/decoding ("codec") algorithms.

In particular, DCT-based coding algorithms group pixels into blocks, e.g. 8×8 or 16×16 pixel blocks. Such blocks are then transformed from a spatial domain into a set of DCT coefficients in the frequency domain. Each DCT coefficient is weighted according to a corresponding DCT basis waveform. These coefficients are then quantized, and nonzero quantized values are compressed using an entropy coder. As a result, low spatial frequency values that represent "basic colors" of the blocks are provided with a high priority. Thus, if DCT-based compression methods work in very low bandwidth condition, the basic colors of the blocks will be kept in preference; thereby, generating the blocky and undesirable color defects in the resulting image.

While the above compression methods would not present a problem in situations where broad bandwidths are available, this is not the case when the video broadcast or communication is to be performed using low bandwidth devices, such as handheld PCs, palm-size PCs or mobile phones. These devices typically operate at bandwidths around 9.6 to 28.8 Kbps, but can operate even below 9.6 Kbps. When a typical broadcast color video is viewed on a low bandwidth device, the result is generally unsatisfactory, as indicated above. These problems, among others, discourage wide application of video communication.

Accordingly, systems and methods to satisfactorily communicate video across a wide range of bandwidth conditions, including low bandwidth conditions that over time may increase with respect to their data throughput capabilities, or vice-versa, are greatly desired.

SUMMARY

Systems and methods for video communication are described. In one aspect, network bandwidth conditions are estimated. Bi-level or full-color video is then transmitted over the network at transmission bit rates that are controlled as a function of the estimated bandwidth conditions. To this end, network bandwidth capability is periodically probed to identify similar, additional, or decreased bandwidth capabilities as compared to the estimated bandwidth conditions. Decisions to hold, decrease, or increase the video transmission bit rate are made based on the estimated bandwidth conditions in view of the probing operations. When the transmission bit rate is increased or decreased, the transmission bit rate is calculated to target an upper or lower bit rate, both of which are indicated by the estimated bandwidth conditions. Bi-level video communication is switched to full-color video transmission, or vice versa, when the video transmission bit rate respectively reaches the upper bit rate or the lower bit rate.

These and other benefits of the various implementations of the invention are described in the following detailed description with reference to the accompanying figures.

BRIEF DESCRIPTION OF THE DRAWINGS

In the figures, the left-most digit of a component reference number identifies the particular figure in which the component first appears.

FIG. 16A shows the template used for I-frames, and FIG. 16B shows the two-frame template used for p-frames. The pixel to be coded is marked with '?' in the illustrations.

FIG. 20 illustrates available and estimated bandwidth, video bit rate, and bit rate round-trip-time (RTT) network measurements with respect to time.

FIG. 23 shows further aspects of the exemplary procedure of FIG. 22, which combines bi-color and full-color video for video communication. For example, among other aspects of the procedure, FIG. 23 includes portions of the procedure that determine whether bandwidth capability probing should be turned on.

FIG. 24 shows portions of the procedure that pertain to switching from full-color video back to bi-color video.

FIG. 25 illustrates the switch from bi-color video encoding to full-color video encoding, and further shows the cessation of bandwidth probing operations.

FIG. 26 illustrates exemplary procedures to control bandwidth probing operations.

FIG. 25 shows further aspects of the exemplary procedure of FIG. 22, which combines bi-color and full-color video for video communication. In particular, FIG. 25 shows portions of the procedure that pertain to full-color video bit-rate analysis and control, and switching from full-color video communication to bi-level video communication as a function of the analysis and control.

DETAILED DESCRIPTION

Overview

Figure 1:
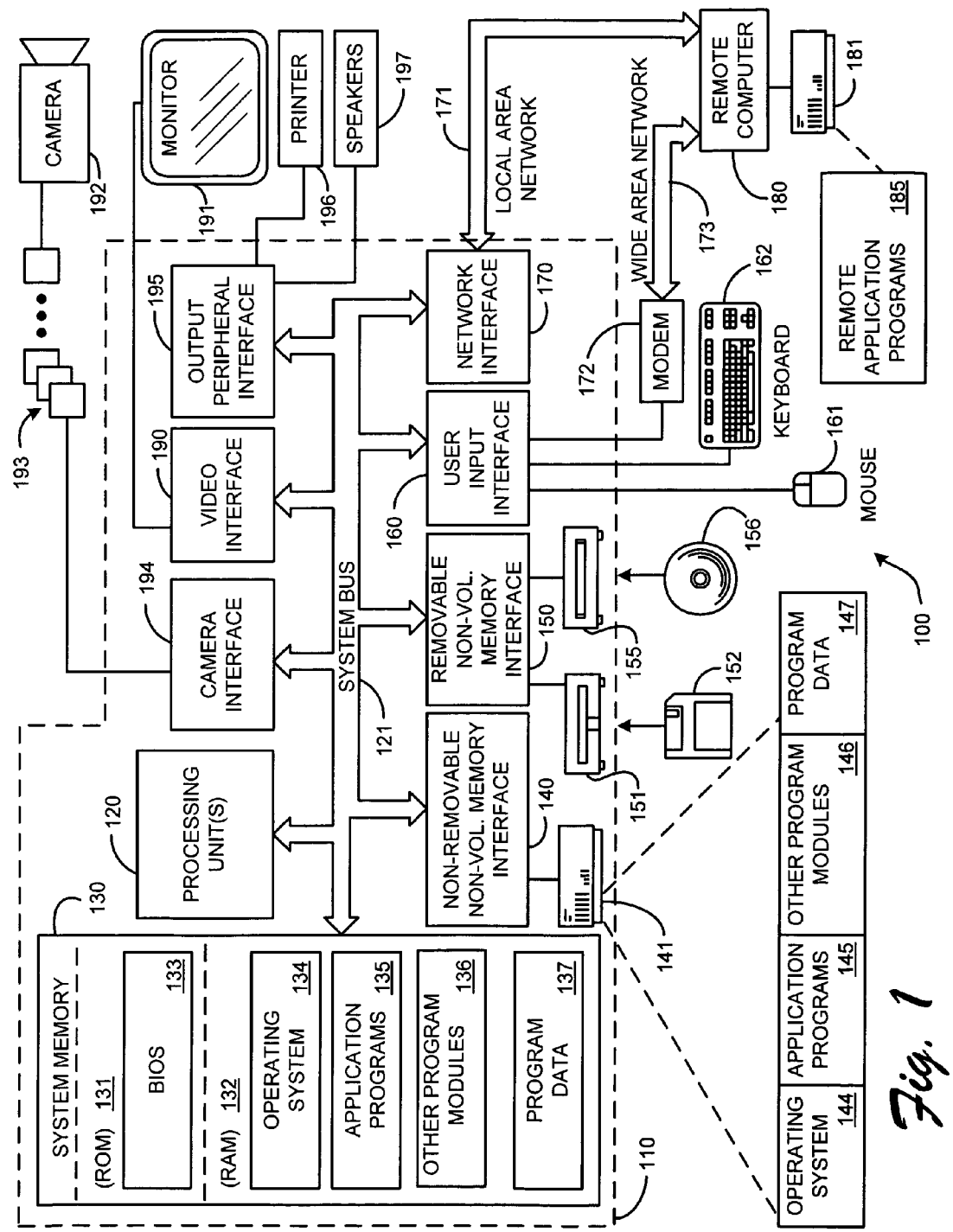
FIG. 1 is a block diagram of an exemplary computing environment within which systems and methods for bi-level and full-color video combination may be implemented.

Bi-level video encoding converts full-color and gray-scale video images to single bit-planes, wherein each pixel of a bit plane takes on one of two possible colors (i.e., the "bi-level" characteristic), black or white. This has the effect of presenting outlines of objects in depicted scenes. Presentation of outlines on a low bandwidth communication device will typically produce a much sharper image on a smaller screen (small screens are typically found on portable communication devices) than would presentation of a full color or gray scale video on the same limited size display. For example, with facial expressions, the motion of the outlines of face, eyes and mouth as presented with bi-level video delivers more information, than colors of the face.

Moreover, converting full-color or gray-scale images to single bit planes (i.e., bi-level encoding) typically utilizes substantially less processing and memory resources as compared to DCT operations that compress full-color or gray-scale images. As a result, bi-level encoding is much faster than DCT encoding. This in turn means that use of bi-level encoding generally results in shorter initial latency during encoding and transmission of video to a video consumer. Such decrease in initial encoding latency facilitates smooth video motion that is characteristic of a bi-level encoded video, even in substantially low bandwidth conditions (e.g., less than 33 Kbps data throughput).

Still in view of the discussed drawbacks of conventional DCT techniques in low bandwidth conditions, in other than low bandwidth conditions DCT encoding may be preferred to bi-level encoding. This is because in conditions of sufficient bandwidth (i.e., not low bandwidth conditions, e.g., >33 Kbps data throughput), use of DCT techniques to encode gray-scale and/or full-color video will typically provide the end-user with a richer video experience than had bi-level video been utilized.

Accordingly, and in view of the relative advantages and disadvantages of bi-level video vs. full-color video communication in different bandwidth conditions, systems and procedures to combine bi-level and full-color video as a function of current and potential network bandwidth conditions are described. In particular, network bandwidth conditions are estimated to identify a threshold band that estimates when network can be considered to be unloaded, loaded, or congested. Network probing operations that transmit redundant data (non-video data) are periodically sent to the receiver to determine if actual bandwidth conditions are similar, worse, or better than the estimated bandwidth conditions. In view of these probing operations, and if the video encoder determines that bit rates should be decreased to avoid unacceptable packet loss, or increased to take advantage of additional network data throughput potential, the video encoder respectively calculates allowable lower or higher target bit rates. The video decoder then respectively adjusts its transmission bit rate to target the calculated allowable bit rate.

If the video encoder's bit rate eventually matches, falls-below (in a decrease decision), or exceeds (in an increase decision) the targeted bit rate, the video switches to a more suitable video encoding algorithm for the current bandwidth conditions. The use of high and low bit-rate thresholds (defined by the threshold band) to make video type switching decisions substantially ensures smooth (non-jumpy) transitions between different video communication algorithms, and thereby produces a combination bi-level/full-color video data stream with continuous playback/decoding characteristics.

Exemplary Operating Environment

Turning to the drawings, wherein like reference numerals refer to like elements, the invention is illustrated as being implemented in a suitable computing environment. Although not required, the invention is described in the general context of computer-executable instructions, such as program modules, being executed by a personal computer. Program modules generally include routines, programs, objects, components, data structures, etc., that perform particular tasks or implement particular abstract data types.

FIG. 1 illustrates an example of a suitable computing environment 100 on which the subsequently described systems, apparatuses and methods for bi-level and full-color video combination may be implemented (either fully or partially). Exemplary computing environment 100 is only one example of a suitable computing environment and is not intended to suggest any limitation as to the scope of use or functionality of systems and methods the described herein. Neither should computing environment 100 be interpreted as having any dependency or requirement relating to any one or combination of components illustrated in computing environment 100.

The methods and systems described herein are operational with numerous other general purpose or special purpose computing system environments or configurations. Examples of well known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for bi-level and full-color video combination includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

System memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that they are at least different copies.

A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. A camera 192 (such as a digital/electronic still or video camera, or film/photographic scanner) capable of capturing a sequence of images 193 may also be included as an input device to the computing device 110. Further, while just one camera is depicted, multiple cameras could be included as input devices to the computing device 110. The images 193 from the one or more cameras 192 are input into the computer 110 via an appropriate camera interface 194. This interface 194 is connected to the system bus 121, thereby allowing the images to be routed to and stored in the RAM 132, or one of the other data storage devices associated with the computer 110. However, it is noted that image data can be input into the computer 110 from peripheral devices different than a camera 192, for example via any of the aforementioned computer-readable media.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. The network connections shown are exemplary and other means of establishing a communications link between the computers may be used.

We now describe further aspects of the application programs for bi-level and full-color video combination in the following sections. In particular, section 1 describes the techniques for generating and playing bi-level video; section 2 describes techniques for generating and playing sketch video; sections 3 and 4 respectively describe the use of the generated bi-level or sketch video in broadcast and communication systems; and section 5 describes bi-level and full-color video combination for video communication.

1. Generating and Playing Bi-Level Video

In this implementation, the process of generating video is preceded by obtaining or capturing an input video that will typically contain both audio and video components. The input video can be either a color video or a gray-scale video. In addition, the video could be initially captured with a digital video camera. In that case, the video can be input directly, via an appropriate interface, into a computing device that is to be used to encode it. Alternately, the video could be captured using a non-digital camera, and then digitized via conventional methods before being input into the computing device for encoding. In a video broadcast application, the video capture process could be either real-time or offline, while in a communication application, the video capture process must be real-time.

Figure 2:
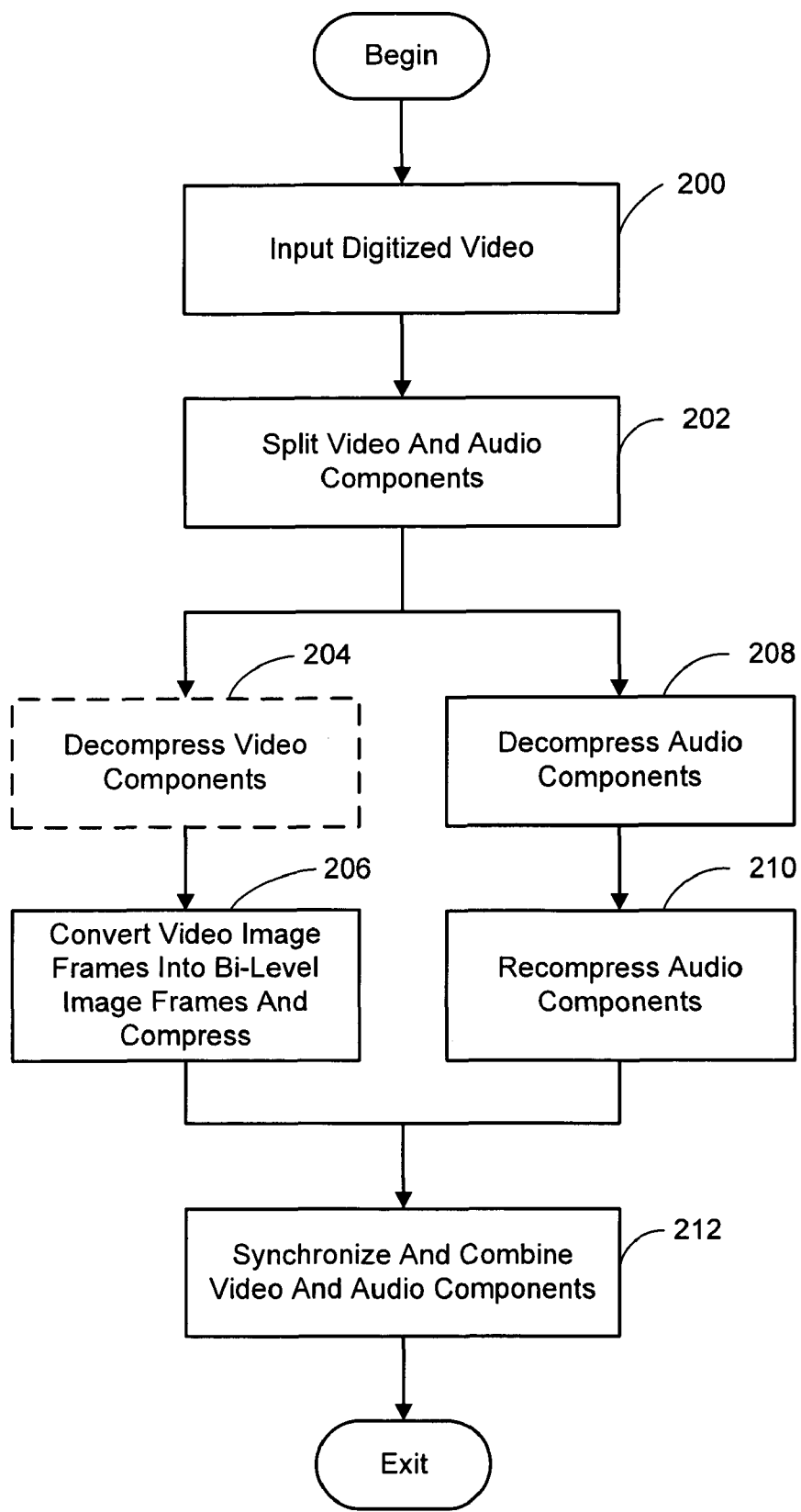
FIG. 2 is a flow chart diagramming an overall process for generating bi-level video according with the present invention.

Referring to FIG. 2, the generating process begins at block 200 by inputting the aforementioned digitized full-color or gray scale video. At block 202, the input video is then split into its audio and video portions. The splitting can be accomplished using any conventional audio-video splitting method. Typically, the input video will have been compressed using a conventional video compression process. At block 204, the video portion of the frame, which constitutes image frames of the video, is decompressed if necessary. Standard decompression techniques are employed for this task and will depend on the process used to initially compress the input video. Since this last action is performed only when the input video is compressed, it is an optional operation. At block 206, the input video image frames are converted into bi-level image frames and compressed using a novel, very low bit rate, bi-level video coding system and process, which will be described in detail in Section 1.1.

While the video component of the input video frame is being decompressed, and then recompressed, the audio component of the frame can be processed concurrently. At block 208, the processing of the audio component of each input video frame entails decompressing the audio data if necessary using standard methods specific to the type of audio compression used to compress the data. In one implementation, this decompression includes a standard noise reduction procedure. At block 210, the audio data is then recompressed. In this implementation, a very low bit rate audio compression method is employed to minimize the amount of data that must be transmitted.

After the video part of bi-level video has been generated and compressed, and the audio data has been compressed, at block 212, the audio and video components are synchronized and combined to produce a complete bi-level video. Any appropriate existing AVI multiplexing technique can be used for this purpose. The completed bi-level video can be in the form of a video file or can take the form of a bit stream. The video file can be used in a broadcast application where the broadcast of the video is to take place sometime after its generation. The bit stream from of the video could be used for an immediate broadcast application, or for a video communications application. In the case of the bit stream, the bi-level generation process can be viewed as a sequential process with the foregoing actions being performed on each frame or a group of frames of the input video. As portions of the overall bi-level video are generated, they are transmitted thus creating the aforementioned bit stream.

To transmit the bi-level video over a network to a receiving device, either from a previously generated file or as a real time bit stream, the video data will typically have to be prepared first using a packetizing technique applicable to the transmission method. For example, if the bi-level video is to be transmitted over the Internet, the data would be packetized via Internet protocols.

1.1. Very Low Bit Rate Bi-Level Video Coding

Figure 3:
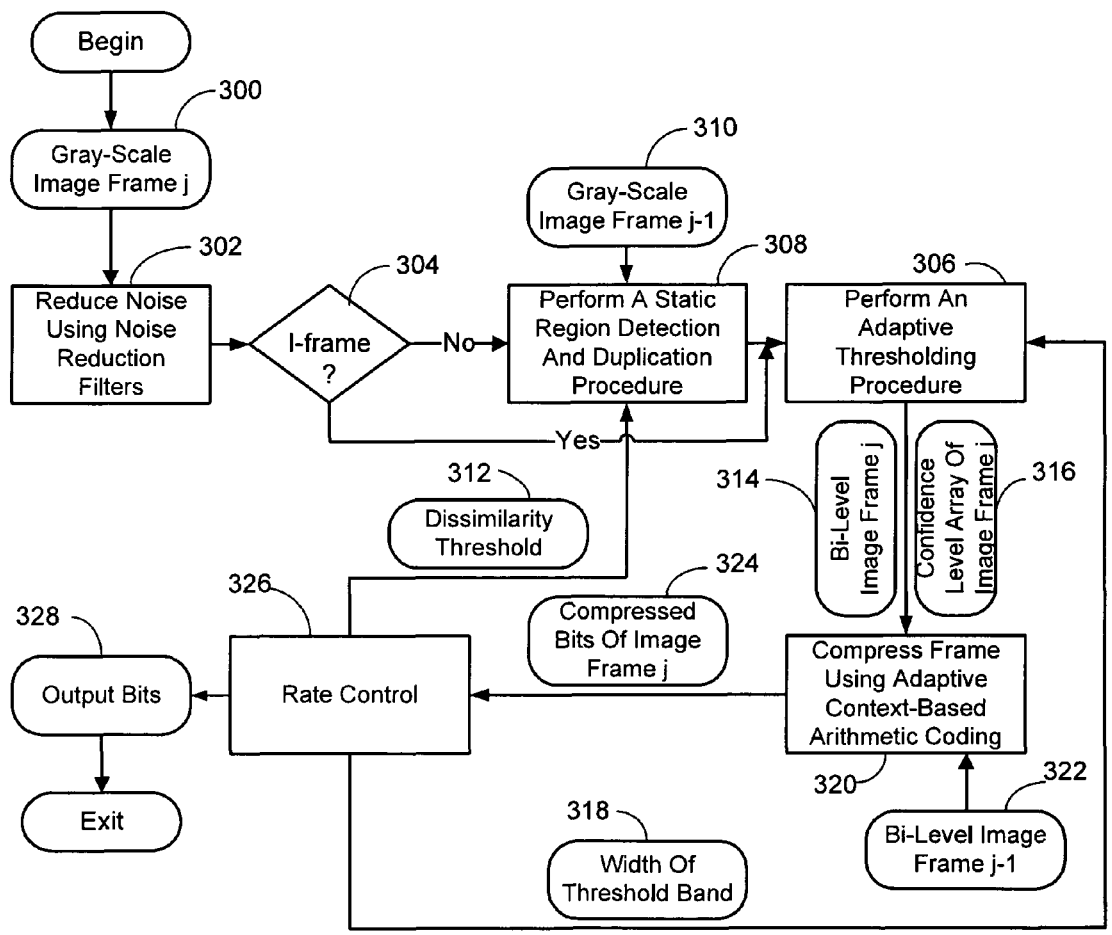
FIG. 3 is a flow chart diagramming a process that implements a very low bit rate bi-level video coding technique of FIG. 2.

In general, referring to FIG. 3, the image frame portion of the bi-level video is generated as follows. If the input video is a full color video, each frame is converted to a gray scale frame using conventional methods. The gray scale frames are then input in sequence to the present conversion process, as indicated by process action 300. Next, the incoming gray scale image frames are put through a group of conventional noise reduction filters (process action 302) to reduce noise. It is then determined whether the frame under consideration is an intra-frame (i.e., I-frame) or an inter-frame (i.e., p-frame), as indicated by process action 304. If the frame is an I-frame, it is processed directly using an adaptive thresholding procedure (process action 306). Otherwise (i.e., the frame is a p-frame), it is compared with its immediately preceding frame using the static region detection and duplication procedure (process action 308). As will be discussed in greater detail later, the static region detection and duplication procedure entails inputting the gray scale image frame (j−1) preceding the p-frame under consideration as indicated by process action 310. In addition, a dissimilarity threshold is input as indicated by process action 312. This dissimilarity threshold defines at what point the difference between a pixel in the p-frame under consideration and the correspondingly-located pixel in the preceding gray scale image frame is considered drastic enough to indicate a change due to movement between the frames.

For image regions that are within a dissimilarity threshold, each pixel is duplicated from its corresponding pixel in the preceding frame, and for pixels of the p-frame under consideration that are greater than the threshold, the pixel values remain unchanged. Once this process is complete the modified p-frame undergoes the aforementioned adaptive thresholding procedure (process action 306). The adaptive thresholding procedure is used to calculate a suitable threshold for each image frame. This threshold is employed to compute both a bi-level image frame and a two-dimensional confidence level array from each gray scale image frame, which are then output as indicated by process actions 314 and 316. The confidence level array is made up of confidence level values assigned to each pixel location of the frame that are indicative of how likely each pixel is to be the color indicated by the threshold.

The confidence level of each bi-level pixel can be simply measured by the difference between the gray-scale value of a pixel and the threshold. If the difference falls outside a threshold band around the computed threshold value for the frame under consideration, then the confidence level is high and a first binary reliability value is preferably assigned to the pixel location. The width of the threshold band is inputted for this purpose from a rate control procedure, as indicated by process action 318. If, however, the aforementioned difference falls within the threshold band, the confidence level is lower and a second binary reliability value is preferably assigned to the pixel location. After that, each frame is compressed by an adaptive context-based arithmetic coding technique (process action 320). As will be discussed later, if the frame is an I-frame, it is coded with an intra-frame template, otherwise it is coded with an inter-frame template constructed with respect to pixels in the previous frame. To this end, the bi-level image frame computed for the frame preceding the frame under consideration is input as indicated by process action 322. For pixels with their confidence levels within the threshold band, their bi-level values are modified according to the prediction of the context-based arithmetic encoding.

The result of the adaptive context-based arithmetic coding technique is a series of bits representing a compressed bi-level image frame, as indicated by process action 324. A rate control procedure that employs factor adjustment and frame dropping can be used to limit the bit rate of the compressed video data output to within a given bandwidth (process action 326), as will be discussed later. As a result, when the present coding process operates at very low bandwidths, what is reserved in high priority is the outline features of the objects. This satisfies the needs in certain applications as discussed previously. The factors adjusted include the dissimilarity threshold mentioned previously, which is output for use in the static region detection and duplication procedure, and the width of a threshold band, which is output and used in the aforementioned adaptive thresholding procedure. Finally, the bit stream representing the compressed bi-level video frames is output as indicated by process action 328. The process modules responsible for accomplishing each of the foregoing actions will now be described in more detail in the sections to follow.

1.1.1 Static Region Detection and Duplication

Flickering effect usually occurs when a scene is illuminated in an unstable lighting condition and can be quite evident after a gray-level image sequence is converted to a bi-level image sequence. The reason for this is that some correspondingly-located pixels in earlier frames of the video will have different pixel values than later frames because the lighting conditions have changed, even though there has been no movement and the pixels are depicting the same thing. In other words, when a thresholding technique is used to determine which pixels are to be what color in the bi-level video, it is possible that a pair of the aforementioned correspondingly-located pixels between two frames could be assigned a different color, despite the fact that nothing has changed but the lighting. As a result, when the bi-level video is played these pixels will appear to flicker. However, the flickering effect can be substantially eliminated. This reduction of flickering effect can also effectively raise the compression ratio in the subsequent adaptive context-based arithmetic coding to be discussed shortly. This is because less data is needed to characterize the frames of the bi-level video if the pixel values change less frequently.

Figure 4:
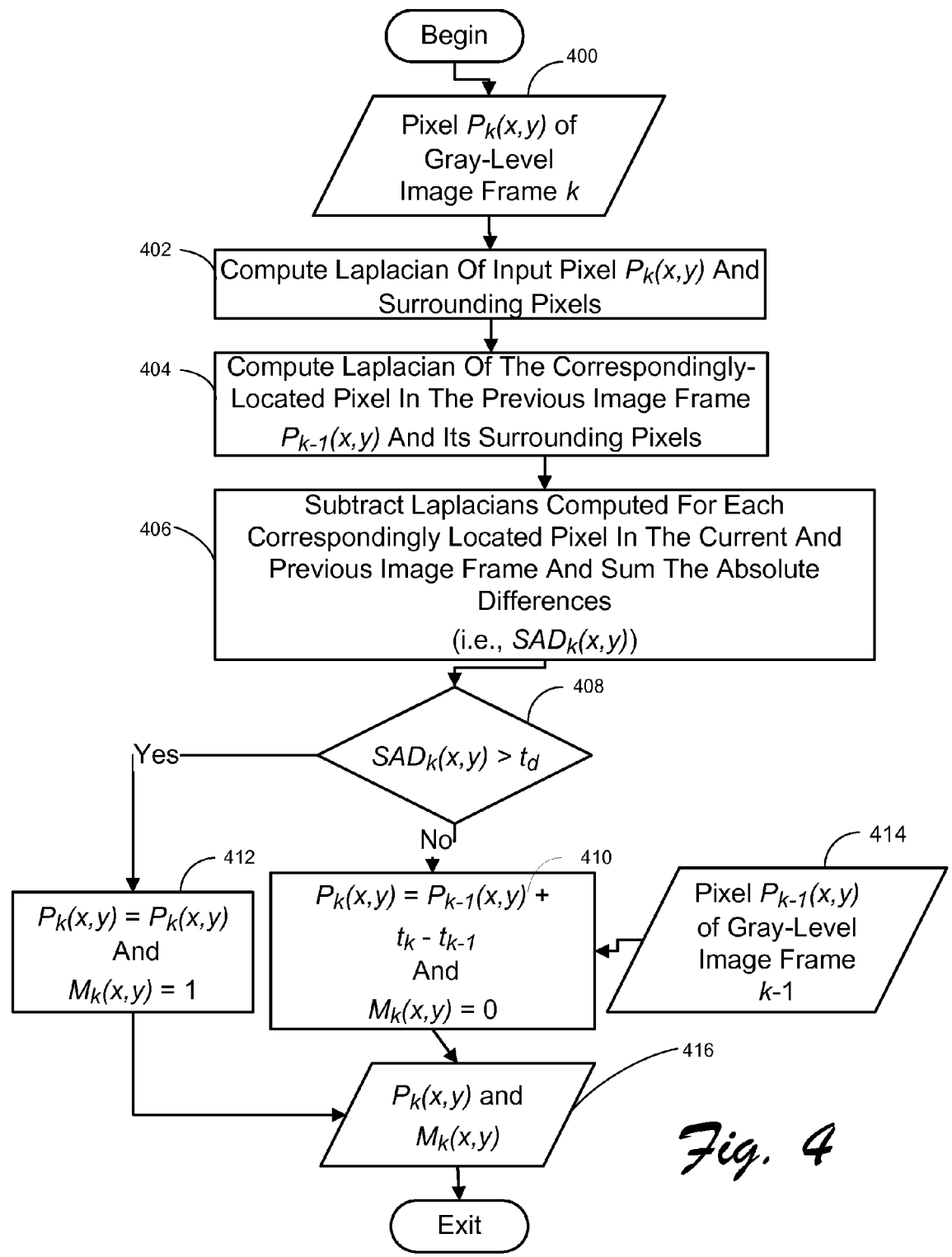
FIG. 4 is a flow chart diagramming a process that implements a static region detection and duplication technique of FIG. 3.

Any method that can determine the similarity of two consecutive frames and separate real motion from flickering can be used to identify the problematic pixel locations. However, in tested embodiments of the present invention the process outlined in FIG. 4 was employed. Essentially, this process involves using a Laplacian of an image as its reference. The Laplacian of a pixel is the second derivative of intensity at that pixel. It represents the relative intensity between the pixel and its neighbors. The advantage of using the second derivative over the first derivative is that it not only eliminates the effect of uniformly-added background intensity, but also eliminates the effect of uniformly-multiplied illumination intensity. Therefore, if the Laplacian of a region remains unchanged, the region is most likely static. Specifically, the gray scale value of a pixel of the input video frame under consideration (i.e., Pk(x,y)) is input as indicated by process action 400, beginning with the second frame of the video sequence. The pixel values of the first frame are not changed in this process. The Laplacian of a pixel is equal to 8 times the gray-level value of the pixel minus all the gray-level values of its eight neighbor pixels, i.e.

$$L(x,y)=8(G(x,y))-G(x-1,y-1)-G(x,y-1)-G(x+1,y-1)-$$
$$G(x-1,y)-G(x+1,y)-G(x-1,y+1)-G(x,y+1)-$$
$$G(x+1,y+1). \quad (1)$$

The variation of the gray-level value of a pixel between two consecutive frames can be categorized into two parts. The first part is due to the real motion of objects, and the second part is caused by lighting variation that results in the instability of bi-level image sequence. In conditions where there are lighting variations, although the gray-level value of a pixel is changed between two consecutive frames, the relative difference of its value with its neighbor pixels remained unchanged. Thus, by judging the difference of the Laplacians of corresponding pixels in two consecutive frames, it is possible to differentiate between regions associated with real motion and those caused by lighting variation, i.e., $$\Delta L_k(x,y)=L_k(x,y)-L_{k-1}(x,y), \quad (2),$$

wherein, k indicates the frame number. Once the difference of the Laplacians of a pair of corresponding pixels in a frame under consideration and its preceding frame has been computed, a threshold could be used to identify if the difference in the Laplacians amounts to a dissimilarity indicative of interframe movement or one merely indicative of a changing lighting condition. However, to prevent imaging noise from causing a false determination, additional processing can be employed to ensure a more accurate outcome. Specifically, the sum of the absolute differences of the Laplacians of corresponding pixels in two consecutive frames in a square surrounding the target pixel is computed. In other words, referring again to FIG. 4, a Laplacian is computed for the target pixel Pk(x,y) and the other pixels in a prescribed square in a frame of the input video under consideration (process action 402).

Similarly, a Laplacian is computed for the pixel in the previous frame corresponding in location to the target pixel, as well as the pixels in that frame corresponding in location to the pixels in the aforementioned square (process action 404). Then, in process action 406, the Laplacians computed for each corresponding pixel between the frames are subtracted from each other and the absolute value of the difference for each pixel location is summed. These summed differences are designated as the SAD of the target pixel, i.e., SADk(x, y). Preferably, nine pixels are chosen as the length of the square (which would thus contain 81 pixels), with the target pixel being centered in the block. However, other configurations may also be employed as desired.

Next, as indicated in process action 408, it is determined if the SAD of the target pixel is greater than a prescribed dissimilarity threshold td, i.e., $$SAD_k(x,y)>t_d \quad (3).$$

In this implementation, td is set between approximately 1.0 and 3.0, although other ranges could also be employed. If the SAD is greater than the dissimilarity threshold, then the target pixel is marked as dissimilar to the corresponding pixel in the previous frame. This is done as indicted in process action 410 by setting a mask value to 1 (i.e., Mk(x,y)=1) and associating it with the pixel. In addition, the pixel value of the target pixel Pk(x,y) as input is retained (at least initially), as indicated in process action 416. The value is retained because the change in the pixel is more likely due to movement and not variations in the lighting conditions. It is noted that the significance of the mask value will be discussed shortly in association with an optional noise reduction procedure.

If, however, the SAD is determined not to be greater than the dissimilarity threshold, then the target pixel is marked as similar to the corresponding pixel in the previous frame. This is done as indicted in process action 412 by setting a mask value to 0 (i.e., $M_k$(x,y)=0) and associating it with the target pixel. Additionally, as indicated in process action 412, the gray-level value is copied from the corresponding pixel in the previous frame and assigned to the target pixel location in lieu of the actual value. Accordingly, the pixel value of the corresponding pixel (i.e., $P_{k-1}$(x,y)) is input as indicated by process action 414. In addition, the imported value is compensated by the difference of thresholds of two consecutive frames, i.e., $t_k-t_{k-1}$ so that the bi-level value of the pixel will be the same as those of previous frame after being determined by the threshold $t_k$ (process action 412). This procedure compensates for the lighting variation effect on the background. Since the threshold $t_k$ is determined according to the gray-level distribution of current frame, the light variation effect on the foreground is also compensated. The pixel value and mask value assigned to the target pixel are then output (process action 416). The foregoing process is repeated for each pixel in the frame under consideration.

In the foregoing static region detection and duplication technique, the pixel values assigned to each consecutive frame are used in the analysis of each future frame rather than their initial values, with the exception of the first frame or an I-frame in the video sequence since its values are never changed.

If it is known that the scene depicted in the video is of the upper body of a person, after all the pixels are marked, the two outermost pixels in each row that have been marked as dissimilar are identified, if they exist. Then, pixels of the row that are between these two outlying pixels are also marked as dissimilar, if they have not already be so marked. This option simply entails flipping the mask value from a 0 to 1, and then reassigned its original gray scale value.

The mask values of the pixels in preceding frames can also be considered in an attempt to reduce noise, if desired. For example, to prevent residue from previous copying, if a pixel is marked as dissimilar in a frame, the correspondingly-located pixel in a prescribed number (e.g., 3) of future frames sequentially following that frame are also marked as dissimilar. This is accomplished by determining for each pixel in a frame under consideration that has been marked as similar (i.e., $M_k$(x,y)=0), whether less than a prescribed number of its corresponding-located pixels in frames sequentially preceding the frame under consideration are each marked as dissimilar. If so, then the pixel in the frame under consideration is marked as dissimilar as well (i.e., $M_k$(x,y) is changed to 1), and reassigned its original gray scale value.

As an example, suppose it is desired to mark the correspondingly-located pixels of three future frames in the sequence as dissimilar whenever a pixel is marked as dissimilar in a frame. In such a case, a pixel marked as similar in a frame currently under consideration would be changed to dissimilar only if three or less of the correspondingly-located pixels in the frames immediately preceding this frame in the sequence are marked as dissimilar. If, however, any more than three of the correspondingly-located pixels in the frames immediately preceding the frame under consideration in the sequence are marked as dissimilar, then the marked value (i.e., $M_k(x,y)=0$) would not be changed. In addition, to further reduce noise, each region of dissimilarity in each frame can optionally be expanded outwards by one pixel. This entails identifying the regions of pixels marked as dissimilar in the frame currently under consideration via conventional methods, and then changing the marked value of the pixels immediately adjacent each region from similar (i.e., $M_k(x,y)=0$) to dissimilar (i.e., $M_k(x,y)=1$). In addition, the original gray scale values are reassigned to these pixels.

Finally, the minimum-sized rectangle that will surround all regions of dissimilarity in each frame under consideration is identified as a bounding box for that frame. The offset of one of the box's corner, and its width and height are recorded. This bounding box information will be employed later in the compression phase of the present bi-level coding process.

1.1.2 Adaptive Thresholding

The pixels of each frame of the input video must be converted to one or the other of the two bi-level colors. For example, if the bi-level colors are to be black and white, then the gray-scale pixels values of each pixel of each frame of the input video are designated as either black or white. One way of accomplishing this task is to establish a threshold grayscale value. All the pixel values falling above the threshold would be designated as white, and all the pixels falling below the threshold value would be designated as black. However, this threshold is preferably selected according to the circumstances of the target image. As the frames of the input video can depict anything, it is advantageous to determine the threshold adaptively for each frame, rather than prescribing a single threshold value. Selecting the threshold value adaptively based on the circumstances of each frame ensures that the features of the scene captured in the resulting bi-level video can be clearly observed. Any conventional method for adaptively selecting a threshold value for each frame can be employed.

For example, in tested embodiments of the present invention, a well known selection method (e.g., Ridler's Iterative Selection method) was employed. The Iterative Selection technique involves making an initial guess at a threshold, and then refining it by consecutive passes through the frame. In other words, it thresholds the image into object and background classes repeatedly, using the levels in each class to improve the threshold. Specifically, the initial guess at the threshold $t_a$ is simply the mean gray level of all the pixels in the frame under consideration. This threshold is then used to collect statistics on the black and white regions obtained. Namely, the mean gray level $t_b$ for all pixels below the initial threshold is computed, as is the mean level to of the pixels greater than or equal to the initial threshold. Next, a new estimate of the threshold is computed as $t_a=(t_b+t_o)/2$, or the average of the mean levels in each pixel class, and the process is repeated using this threshold. When no change in threshold is found in two consecutive passes through the image, the process stops, and the last computed threshold $t_a$ is designated as the selected threshold for the frame under consideration.

There may, however, be some input videos for which an automatic thresholding method (such as the one described above) will not produce the optimal thresholds that result in the best visual quality for the bi-level video. One way of addressing this problem is to allow user to adjust the threshold manually. For example, as each frame of the input video is converted to a bi-level video frame, it could be rendered and played back to the user. The user would have some sort of interface to adjust the automatically computed threshold.

For instance, a graphical user interface such as the currently popular slider could be rendered onto the user's display adjacent to the region where the playback of the newly created bi-level video frames is being shown. The user employs a cursor displayed on the display screen to "slide" a knob on the linear slider in one direction or the other to adjust the threshold. As the threshold is changed, the impact is seen in the bi-level video being played back to the user on his or her display screen. The user can adjust the threshold further as desired to optimize the clarity of the resulting bi-level video. The threshold could theoretically vary anywhere from a gray scale value of 0 up to a value of 255. Therefore, the user could theoretically adjust the threshold up from the current value to an upper limit of 255, or down from the current value to a lower limit of 0. Preferably, the user interface employed would indicate the current threshold level.

For example, in the case of the slider, the knob would appear along the slide at a point proportional to the current threshold level, where one end of the slider represent the 0 level and the other end represents the 255 level. Mathematically, the final threshold for a frame under consideration would be $t=t_a+t_c$, where $t_c$ denotes the threshold compensation interjected by the user.

1.1.3 Threshold Band

Figure 5:
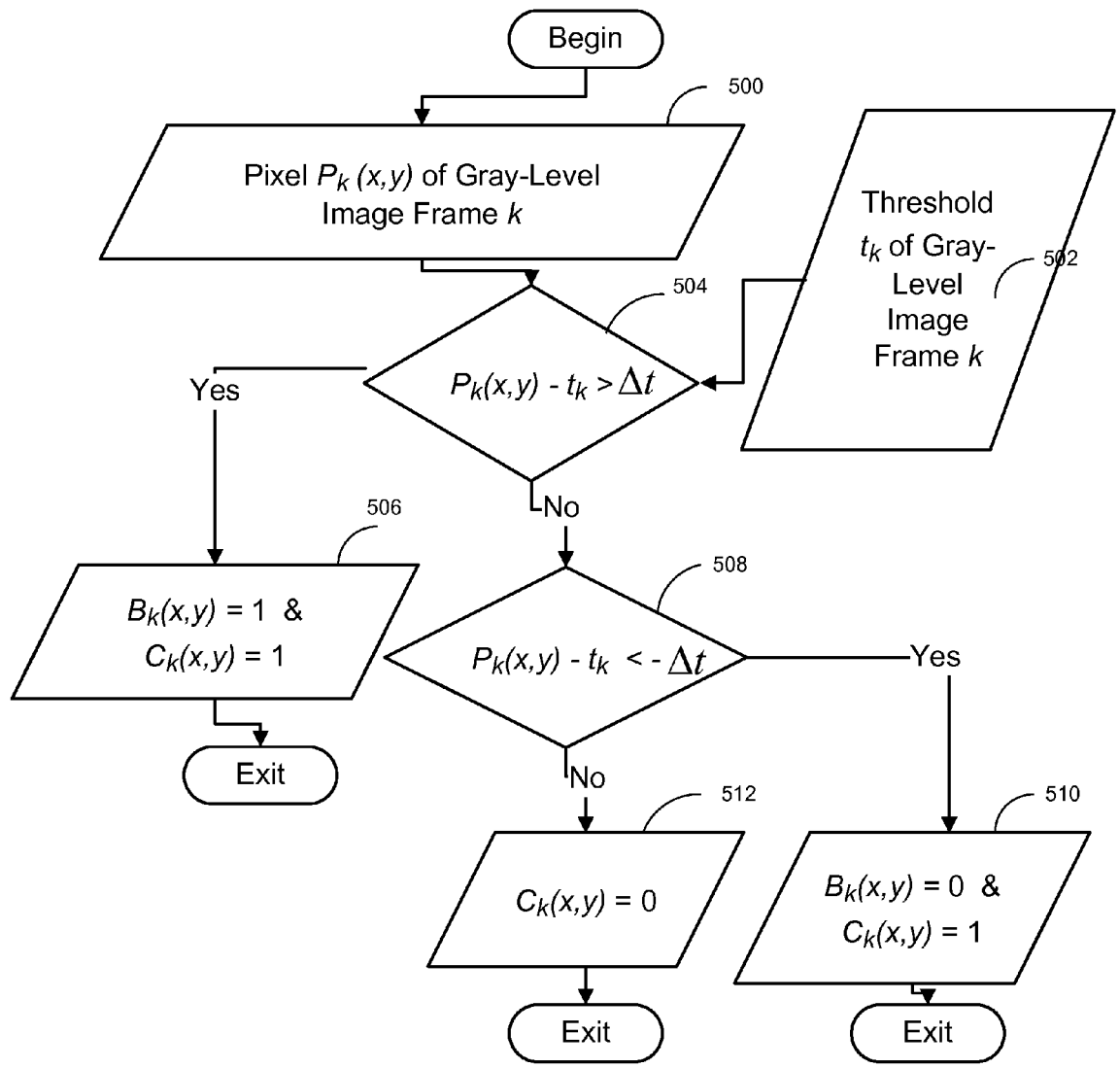
FIG. 5 is a flow chart diagramming a process that implements a threshold band technique of FIG. 3.

While the decision as to whether a pixel in a gray-level image frame is converted to one or the other of the bi-level colors can be determined by the single threshold value t described above, it can be advantageous to employ a threshold band instead. Specifically, a threshold band of $2\Delta t$ can be established. This threshold band represents a region around the selected threshold for a frame of the input video in which the decision as to whether the pixel should be designated as one of the other of the bi-level colors is a close call. Outside the threshold band the decision is clear cut. It has been found that a value of $\Delta t$ within a range of 0 to 5 gray scale levels sufficiently characterizes the so-called close call region, however other ranges may also be employed as desired. The threshold band option is implemented by processing each pixel of each frame of the input video as outlined in FIG. 5. Specifically, the gray scale value of a pixel of the input video frame under consideration (i.e., $P_k(x,y)$) is input as indicated by process action 500.

Additionally, the threshold value $t_k$ currently assigned to the frame under consideration is input as indicated by process action 502. This threshold value $t_k$ is the sum of the automatically computed threshold $t_a$ and any user input compensation tc, as described previously. It is first determined whether the gray-level value of the pixel $P_k(x,y)$ less the threshold value tk is greater than the prescribed $\Delta t$ value (process action 504). If it is, the bi-level value ($B_k(x,y)$) of the pixel is designated to be the lighter of the two bi-level colors (e.g., white) by assigning a first binary value to the pixel (e.g., preferably a "1"). In addition, a confidence level ($C_k(x,y)$) indicating that the pixel is not within the aforementioned threshold band is assigned to the pixel. In this implementation, this confidence level is a binary value, specifically a "1". These values (i.e., $B_k(x,y)=1$ and $C_k(x,y)=1$) are output, as indicated by process action 506.

If, however, it is determined the aforementioned difference is not greater than the prescribed $\Delta t$ value, then it is determined whether the gray-level value of the pixel $P_k(x,y)$ minus the threshold value $t_k$ is less than a value of $-\Delta t$ (process action 508). If it is less, then the bi-level value ($B_k(x,y)$) of the pixel is designated to be the darker of the two bi-level colors (e.g., black) by assigning a second binary value to the pixel (e.g., preferably a "0"). In addition, the aforementioned confidence level indicating that the pixel is not within the aforementioned threshold band is assigned to the pixel (i.e., $C_k(x,y)=1$). These values (i.e., $B_k(x,y)=0$ and $C_k(x,y)=1$) are output, as indicated by process action 510.

If, however, the aforementioned difference shows that the gray scale value of the pixel under consideration is not less than negative $\Delta t$, this indicates that the pixel falls within the prescribed threshold band of $2\Delta t$. In such a case, a bi-level pixel value is not immediately assigned to the pixel. Instead, the pixel value will be set to whatever value is predicted for the pixel under consideration in a subsequent arithmetic coding process to be discussed next. To indicate that the pixel is to be assigned the predicted value, a confidence level having a binary value opposite that assigned to the pixels falling outside the threshold band is assigned to the pixel under consideration (i.e., $C_k(x,y)=0$) and output as indicated by process action 512.

1.1.4 Adaptive Context-Based Arithmetic Coding

A modified adaptive context-based arithmetic encoding scheme is used to compress the bi-level image sequences. Similar to MPEG4 shape coding, and prior to coding the first pixel, the arithmetic encoder is initialized. Each binary pixel is then encoded in raster order. The process for encoding a given pixel generally entails first computing a context number, then indexing a probability table using the context number. Finally, the indexed probability is used to drive an arithmetic encoder. When the final pixel has been processed, the arithmetic code is terminated.

Figures 16A, 16B:
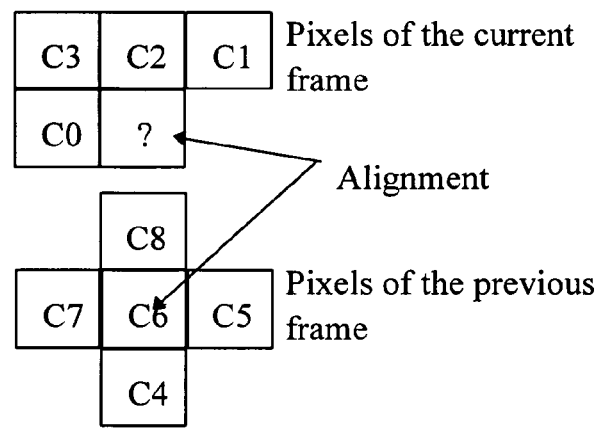
FIGS. 16A and 16B illustrate the context templates employed in the adaptive context-based arithmetic coding technique according to the present invention.

In general, the same template and context construction scheme as those in MPEG4 [10] are applied. For intra coded frames, a 10-bit context is built for each pixel as illustrated in FIG. 16A. For inter coded frames, temporal redundancy is exploited by using pixels from the previous frame to make up part of the context. Specifically, a 9-bit context is built as illustrated in FIG. 16B.

One difference of the present adaptive context-based arithmetic encoding process compared to MPEG4 Shape Coding is that the present process codes the whole frame rather than lots of blocks and the probability table is adaptively constructed during encoding. In other words, an adaptive arithmetic coder is used rather than an arithmetic coder with a fixed probability table. The reason is that an adaptive arithmetic coder is more stable and more flexible so as to better handle working with different kinds of video scenes. Unlike binary alpha planes in MPEG4 Shape Coding, which are usually simple and well-regulated, bi-level videos may include many scenarios, from low-motion videos to high-motion videos, from cartoon clips to real scene clips, etc. So it is hard to train a general probability table for all these scenes. On the other hand, using an adaptive arithmetic coder makes the block-based coding method adopted in MPEG4 Shape Coding inefficient since it is substantially difficult for an adaptive method to converge in such a short block length.

In the present method, the initial probability of each context number could be quoted from a pre-trained table or be all set equal to ½. The latter is called a "½" table. A pre-trained table can be generated from conventional bi-level video clips or previous frames in the same image sequence. In either case, statistical results are incorporated into the probability table during encoding. This is why the present encoding scheme is called "adaptive encoding". If computational power permits, both initial tables can be used and the one that produces the fewest bits is selected. Tests show that usually a pre-trained table is better than a "½" table as an initial table. It is noted that an indicator is included in the bit stream to indicate to the decoder which type of probability table was employed to encode each frame so that the same table can be used in the decoding process.

Certain frames are also preferably designated as intra-frames (i.e., I-frames), while a series of frames following each I-frame in the bi-level video sequence are designated as inter-frames (i.e., p-frames). All the pixels of an I-frame are encoded, whereas only those pixels found within the previously defined bounding box are coded for a p-frame. The pixels in the p-frames outside the bounding box are deemed to be the same as the last-preceding frame. Specifically, the first frame of the bi-level video is designated as an I-frame, and then a prescribed number of frames following the first in sequence are designated as p-frames. This is followed by designating the next consecutive frame as an I-frame and repeating the process as the bi-level frames are generated. The number of p-frames between I-frames is preferably chosen so as to minimize problems associated with unicasting or multicasting log-on delays, jumpy transitions and transmission error propagation. In tested embodiments of the present invention, it was found that limiting the number of p-frames existing between I-frames to 3-5 seconds times the frame rate of input video produced acceptable results. It is noted that the location and size of the bounding box in the overall bi-level image frame of a p-frame are added to the bit stream data associated with that p-frame. This is so the receiver can reconstruct the entire bi-level frame from just the encoded data by assuming the pixels outside the bounding box are the same as the correspondingly located pixels in the last frame preceding the p-frame under consideration.

In regard to the use of I-frames and p-frames, each frame can be compressed with the aforementioned adaptive context-based arithmetic encoding scheme in the intra or inter mode. Both modes result in the generation of a single binary arithmetic codeword. The various coding modes are characterized by their context computation and the probability table used. However, for inter mode, only pixels within the bounding box are encoded. When building contexts, any pixels outside the limits of an I-frame that are to the left, right and above are assumed to be zero. Finally, in addition to the pre-trained table and the "½" table, p-frames can also be treated as I-frames and encoded using an I-frame table provided that such a table result in the minimum bits being produced.

Figure 6:
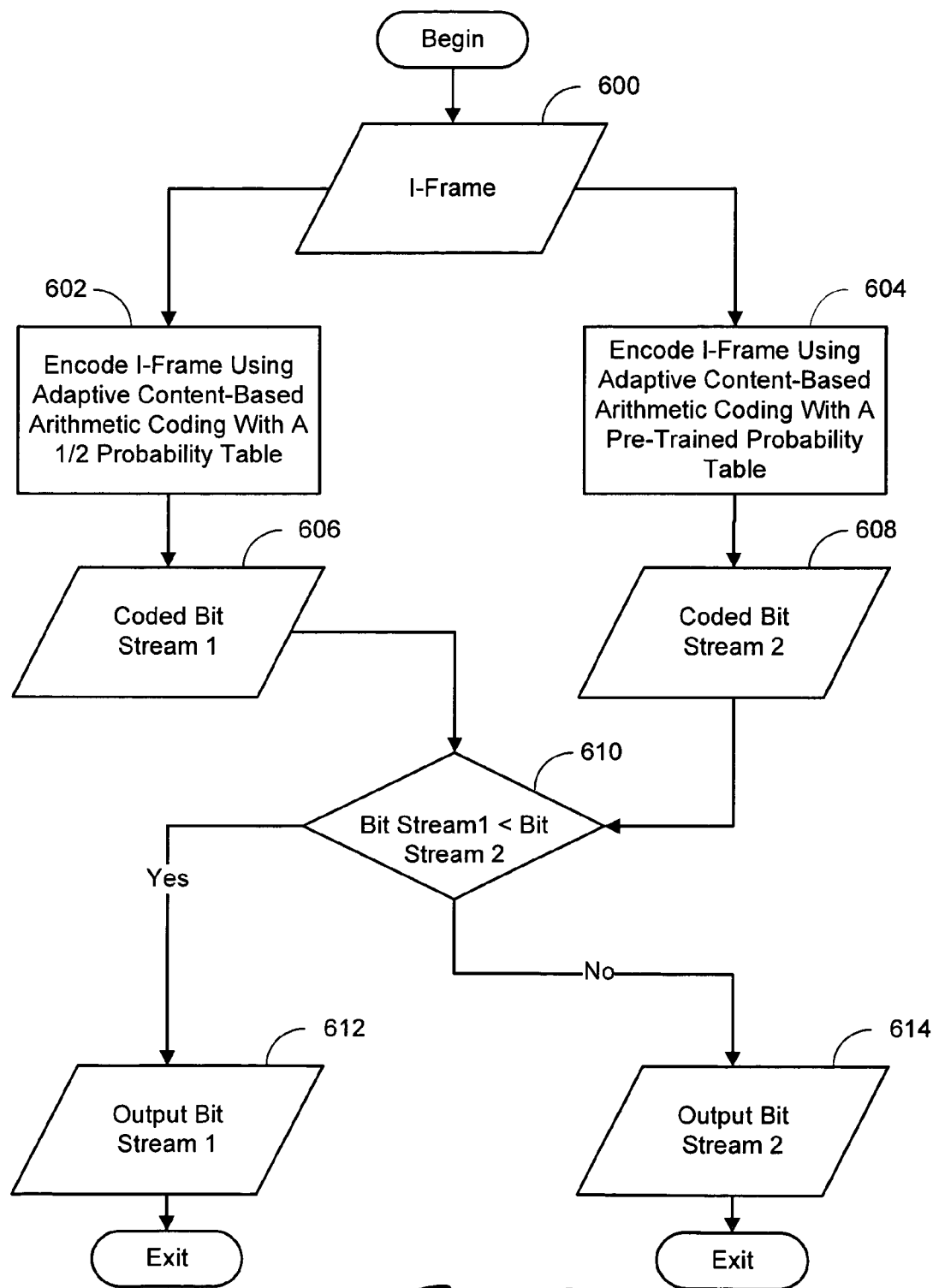
FIG. 6 is a flow chart diagramming a process that implements an adaptive context-based arithmetic coding technique of FIG. 3 for I-frames.

Thus, referring to FIG. 6, a bi-level video I-frame generated via the process described previously, is preferably encoded and compressed as follows. First, a bi-level video frame that has been designated as an I-frame is input into two arithmetic coding modules, as indicated by process action 600. The first arithmetic coding module adaptively encodes the I-frame using a so-called ½ probability table as an initial probability table (process action 602), whereas, the second arithmetic coding module adaptively encodes the I-frame using a pre-trained probability table as an initial probability table (process action 604). Both of the modules use an intra-frame template as shown in FIG. 16A. This produces two separate coded bit streams representing the I-frame as indicated by process actions 606 and 608. In process action 610, it is determined which of the two coded bit streams exhibits the lowest bit rate. If the bit stream produced using the ½ probability table exhibits the lowest rate, it is output as indicated by process action 612. Otherwise, the bit stream produced using the pre-trained probability table is output (process action 614).

As indicated previously, p-frames are handled differently. Specifically, only the pixels inside the previously-defined bounding box are coded and usually an inter-frame template as shown in FIG. 16B is used. However, a p-frame can also be coded as an I-frame using an intra-frame template. Accordingly, while just a ½ table and pre-trained table together with an inter-frame template could be employed to encode each p-frame, it is also possible to additionally encode a p-frame using an I-frame table together with an intra-frame template. Specifically, referring to FIG. 7, a bi-level video frame produced via the process described previously and designated as a p-frame, is preferably encoded and compressed as follows. First, the p-frame is input into three arithmetic coding modules, as indicated by process action 700. The first arithmetic coding module adaptively encodes the p-frame using an inter-frame template with a ½ probability table as an initial probability table (process action 702).

Figure 7:
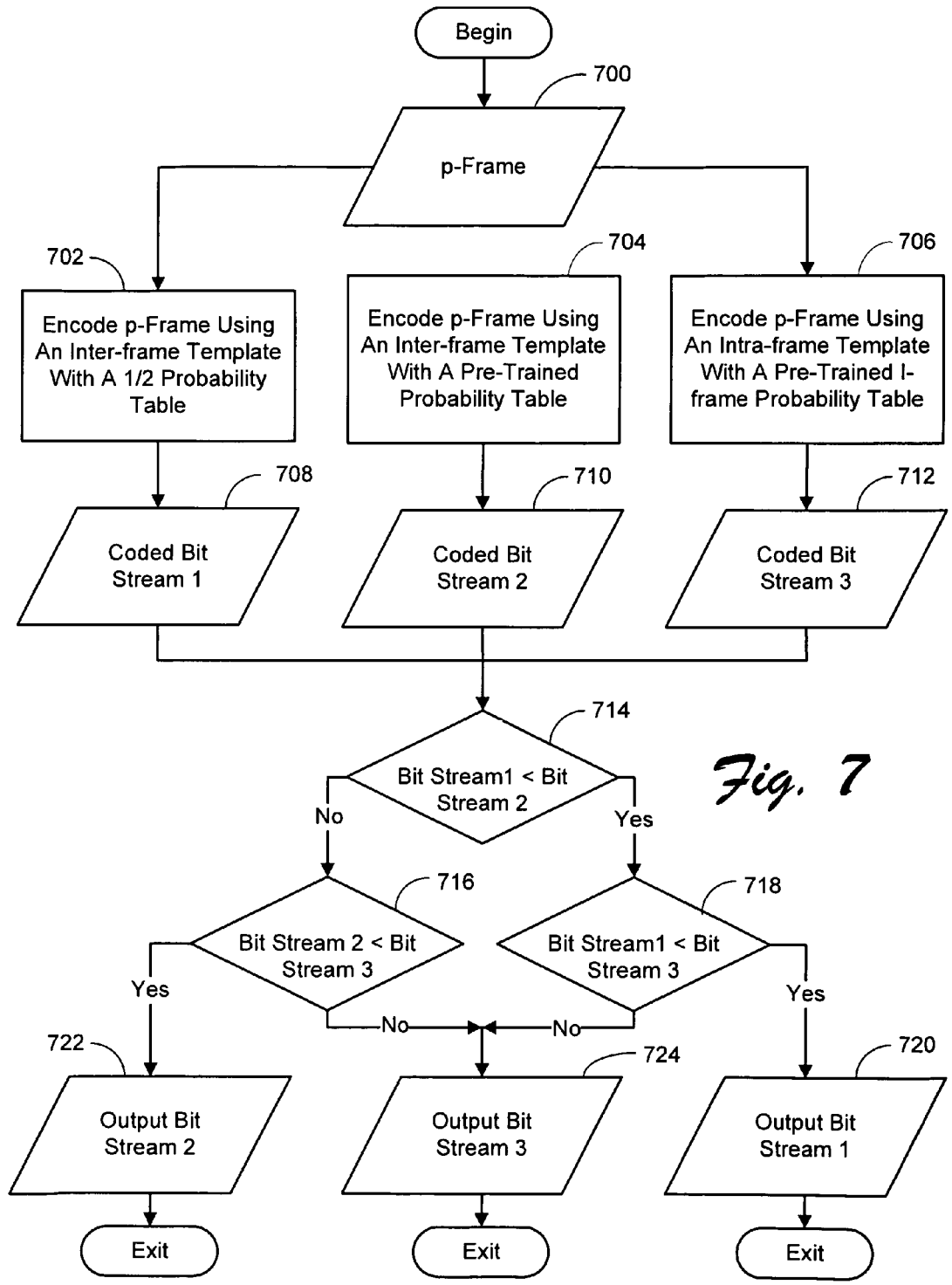
FIG. 7 is a flow chart diagramming a process that implements one embodiment of the adaptive context-based arithmetic coding technique of FIG. 3 for p-frames.

The second arithmetic coding module adaptively encodes the p-frame using an inter-frame template with a pre-trained probability table as an initial probability table (process action 704). And finally, the third arithmetic coding module adaptively encodes the p-frame as an I-frame using an intra-frame template with a pre-trained I-frame probability table employed to encode the last I-frame preceding the p-frame under consideration (process action 706). FIG. 7 only shows one arithmetic coding module employing an I-frame probability table. However, there could be more.

For example, an additional arithmetic coding module employing the final version of the probability table resulting from adaptively encoding the I-frame could be included or used in lieu of the I-frame's initial pre-trained table. As for the configuration depicted in FIG. 7, the encoding actions produce three separate coded bit streams representing the p-frame as indicated by process actions 708, 710 and 712. In process actions 714, 716 and 718, it is determined which of the three coded bit streams exhibits the lowest bit rate. If the bit stream produced using the ½ probability table exhibits the lowest rate, it is output as indicated by process action 720. If the bit stream produced using the pre-trained p-frame probability table exhibits the lowest rate, it is output as indicated by process action 722. Otherwise, the bit stream produced using the pre-trained I-frame probability table is output (process action 724).

1.1.5 Bi-Level Video Encoding Rate Control

In one implementation, a rate control mechanism is implemented in the present bi-level video coding process. (As described below, a different implementation switches between bi-level and full-color video encoding as a function of estimated available bandwidth conditions). Essentially, this bi-level video encoding rate control involves adaptively adjusting the width of the aforementioned threshold band and the dissimilarity threshold. The wider the threshold band is, the more pixels that are coded according to the context-based arithmetic probability, and therefore the lower the bit rate exhibited by the generated bit stream. Similarly, the higher the dissimilarity threshold is, the more pixels that are viewed as being similar to corresponding pixels in previous frame, and therefore the lower the bit rate exhibited by the generated bit stream. While any appropriate method for adjusting the threshold band and the dissimilarity threshold can be employed, a simple rate control scale factor table is preferably used to provide the desired adaptive rate control adjustment. Table 1 provides an example of such a table.

TABLE 1

| Rate control scale factor f | Dissimilarity threshold $t_d$ | Half-width of threshold band $\Delta t$ |
|---|---|---|
| 9 | 3.0 | 5 |
| 8 | 3.0 | 4 |
| 7 | 2.5 | 4 |
| 6 | 2.5 | 3 |
| 5 | 2.0 | 3 |
| 4 | 2.0 | 2 |
| 3 | 1.5 | 2 |
| 2 | 1.5 | 1 |
| 1 | 1.0 | 1 |
| 0 | 1.0 | 0 |

Figure 8A:
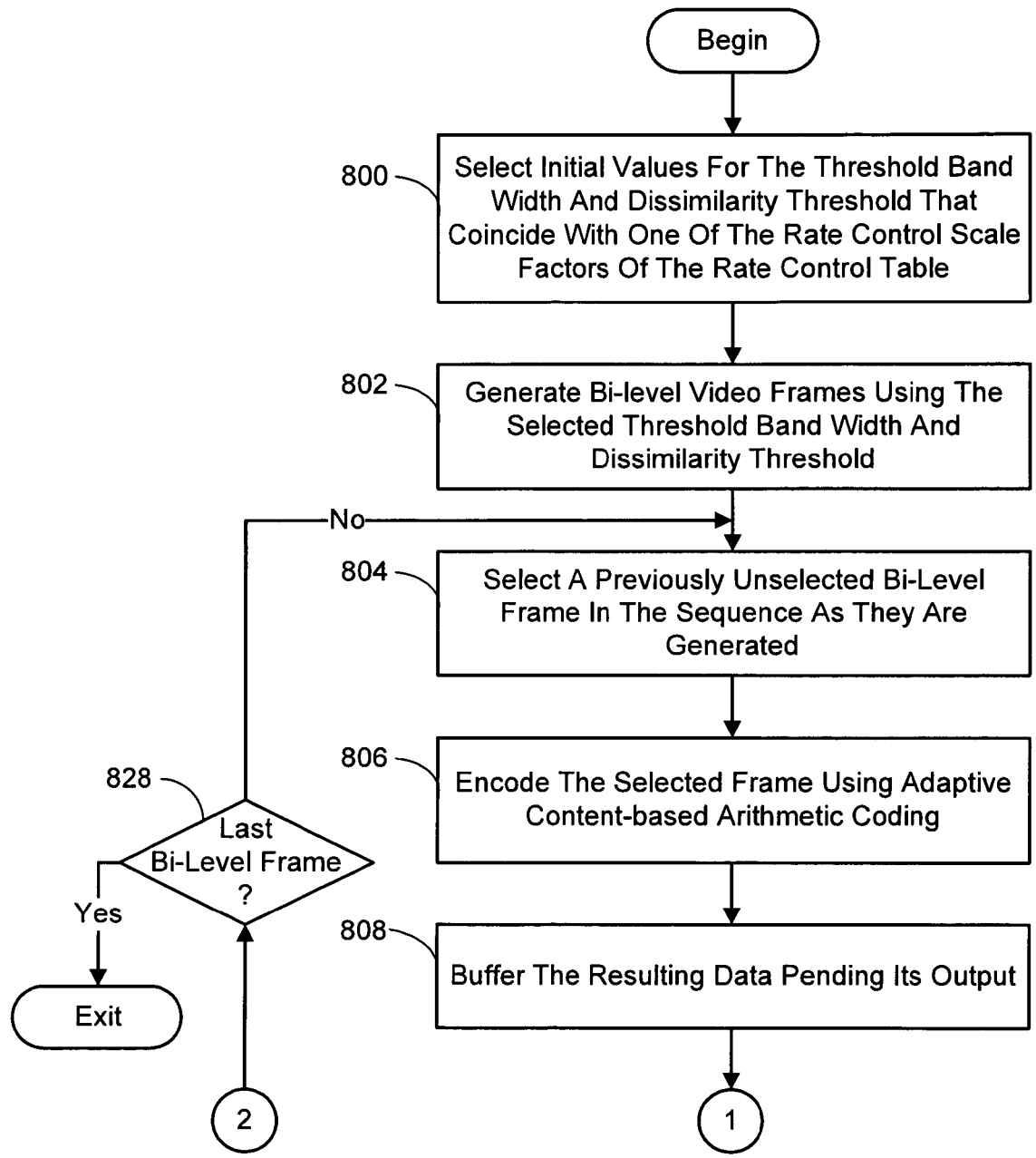
FIGS. 8A and 8B depict a flow chart diagramming a process that implements an optional rate control technique of FIG. 3.
Figure 8B:
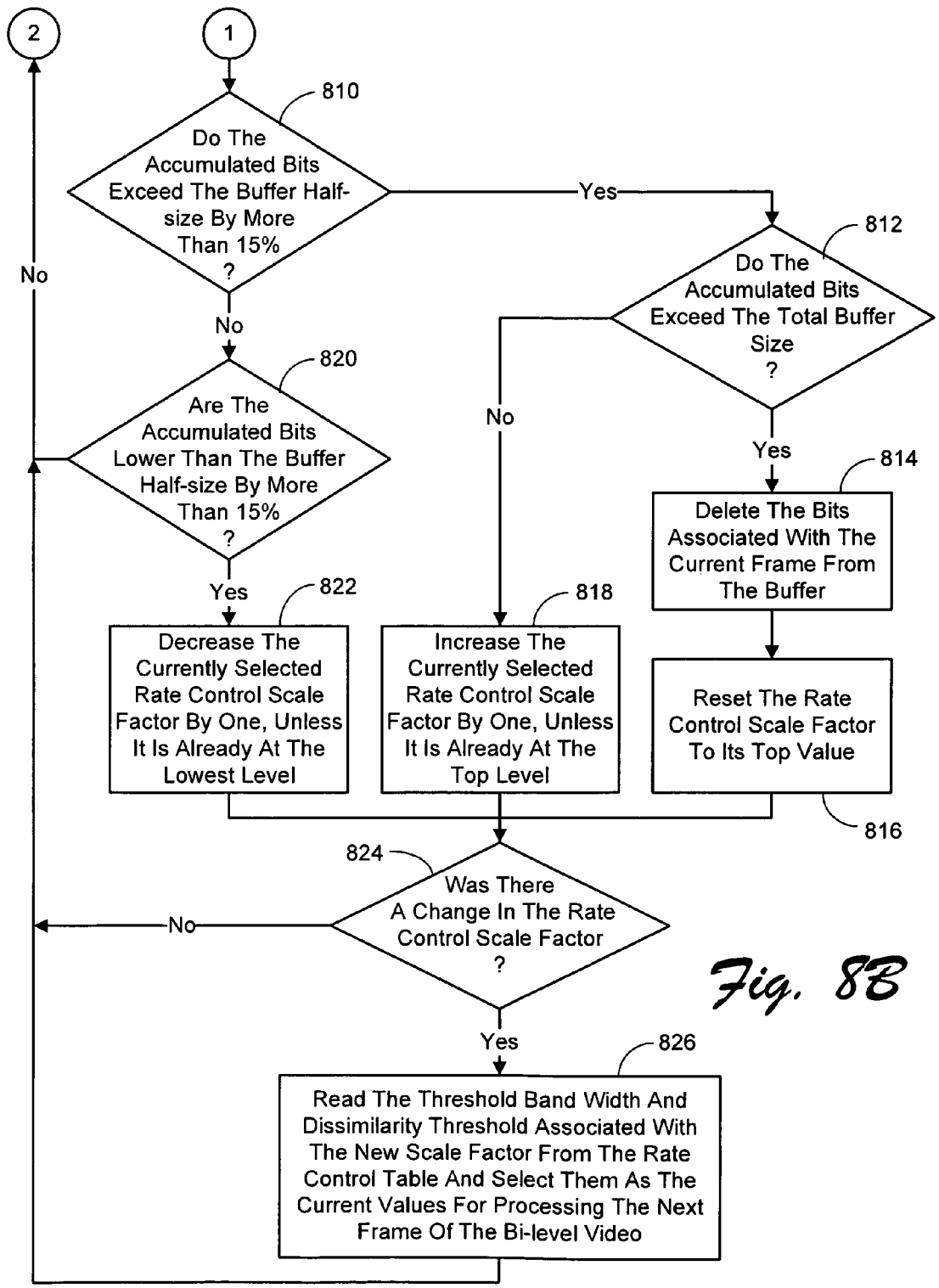

Generally, referring to FIGS. 8A-B, the initial values for the width of threshold band and the dissimilarity threshold are selected to coincide with one of the rate control scale factors of the rate control table, prior to generating the first bi-level video frame from the input video (process action 800). The bi-level video frames are then generated in sequence using the selected threshold band width and dissimilarity threshold (process action 802), as described previously. Each bi-level frame generated is selected in the sequence they are generated (process action 804), and encoded using the adaptive context-based arithmetic coding technique described previously (process action 806). The resulting data is buffered pending its output, as indicated in process action 808.

When the goal is to maintain the average bit rate of the output bit stream to less than or equal to a target bit rate consistent with the previously described low bandwidth devices, buffer size B is defined as $$B = I_{max} + 4r/n, \quad (4).$$

Referring to equation (4), $I_{max}$ is the maximum number of bits per frame that it is allowed to send to the buffer, r is the maximum video bit rate during the connection in bits per second, and n is the effective frame rate. If the I-frame interval is $\tau$, the number of frames in the I-frame interval is $\tau n$. A group of pictures is defined as an I-frame and all the ($\tau n-1$) p-frames in the interval. The bits that are assigned to the whole group of pictures are $r\tau$. Suppose that the I-frame consumes $b_i$ bits. The bits left to each p-frame is $b_p = (r\tau - b_i)/(\tau n - 1)$. The mechanism of the buffer management is that it is ensured the I-frame in each group of pictures, i.e. as soon as an I-frame is input into the buffer, the same size of bits is immediately removed from the buffer.

In an extreme case, if the size of an I-frame is larger than all the bits assigned to the whole group of pictures, the bits that will be assigned to the next group of pictures are used together. For the rest of the p-frames in the group of pictures, after a P-frame is inserted into the buffer, bp bits are removed from the buffer. This arrangement guarantees equivalence of the output bit rate. As the data associated with each selected frame is buffered, it is determined if the accumulated bits exceed the half-size of the buffer by 15% (process action 810).

Whenever the accumulated bits exceed the half-size of the buffer by 15%, it is next determined if the accumulated bits exceed the total buffer size (process action 812). If so, the bits associated with the current frame are deleted from the buffer (process action 814). In addition, the rate control scale factor f is set to its top value, whatever its current value happens to be (process action 816). If, however, the accumulated bits do not exceed the total buffer size, then the currently selected rate control scale factor f is increased by one, unless it is already at the top level (process action 818). If the half-size of the buffer is not exceeded by 15%, then it is determined whether the accumulated bits are lower than the half-size of the buffer by 15% (process action 820). If not, it is next determined whether the selected bi-level frame is the last frame (process action 828). If it is, the process ends. Otherwise, the next frame is selected for encoding (process action 804).

However, whenever the accumulated bits are lower than the half-size of the buffer by 15%, the rate control scale factor f is decreased by one, unless it is already at the bottom level (process action 822). It is noted that because the foregoing process will not have the problem of underflow, the buffer will be prevented from becoming empty when there are fewer bits generated. As indicated in process action 824, it is next determined if the above actions resulted in a change to the rate control scale factor. If not, then it is again determined if the selected bi-level frame is the last frame (process action 828). If so, the process ends. If not, the next frame is selected for encoding (process action 804).

Conversely, if it is determined that the rate control scale factor was changed, then the values for the width of threshold band and the dissimilarity threshold associated with the new scale factor are read from the rate control table, and selected as the current values for use in processing the next frame of the bi-level video, in lieu of the previously selected values (process action 826). It is next determined in process action 828 whether the currently selected frame is the last frame of the bi-level video. If it is the last frame, the process ends. If not, then the next frame is selected for encoding (process action 802), and the process of actions 804 through 828 are repeated as appropriate.

The net result of the foregoing process is that the average bit rate is maintained less than or equal to a target bit rate, as desired. It is noted that while the foregoing rate control process indicated that the rate control scale factor is not changed unless the accumulated bits in the buffer were found to exceed or fall below the half size of the buffer by 15%, other percentages could be employed as desired. For instance, any percentage less than 50% could be employed without detrimental effect.

It is noted that another difference between the present adaptive context-based arithmetic encoding scheme and standard MPEG4 Shape Coding is that a lossy mechanism is introduced with a view to the specific scenarios of video communication. Specifically, the half-width of threshold band is determined in rate control process described above, and then used in the adaptive context-based arithmetic encoding process. For those pixels whose confidence levels fall within the threshold band, the bi-level values of the pixels are assigned according to the indexed probability in probability table. Therefore a higher compression ratio can be reached.

1.2. Playing Bi-level Video

The transmitted bi-level video generated in accordance with the foregoing generating process will be processed by a receiving device. The receiving device essentially "plays" the bi-level video by decompressing it and then displaying the decompressed image frames in sequence. In addition, if the receiving device has sound producing capability (such as via a speaker, or an audio output connected to a earphone or the like), the receiver will also decompress and play the audio components of each frame of the bi-level video. To take full advantage of the present invention, the receiving device itself is preferably one of the previously mentioned low bit rate devices such as a hand-held PC, palm-sized PC, or mobile telephone. However, it is not intended to limit the invention to such devices. Rather, in general, a bi-level video can be played on any device having a processor capable of decoding the incoming video data and a display capable of displaying bi-level images, regardless of its bandwidth capability, such as for instance a desktop PC or laptop PC.

Figure 9:
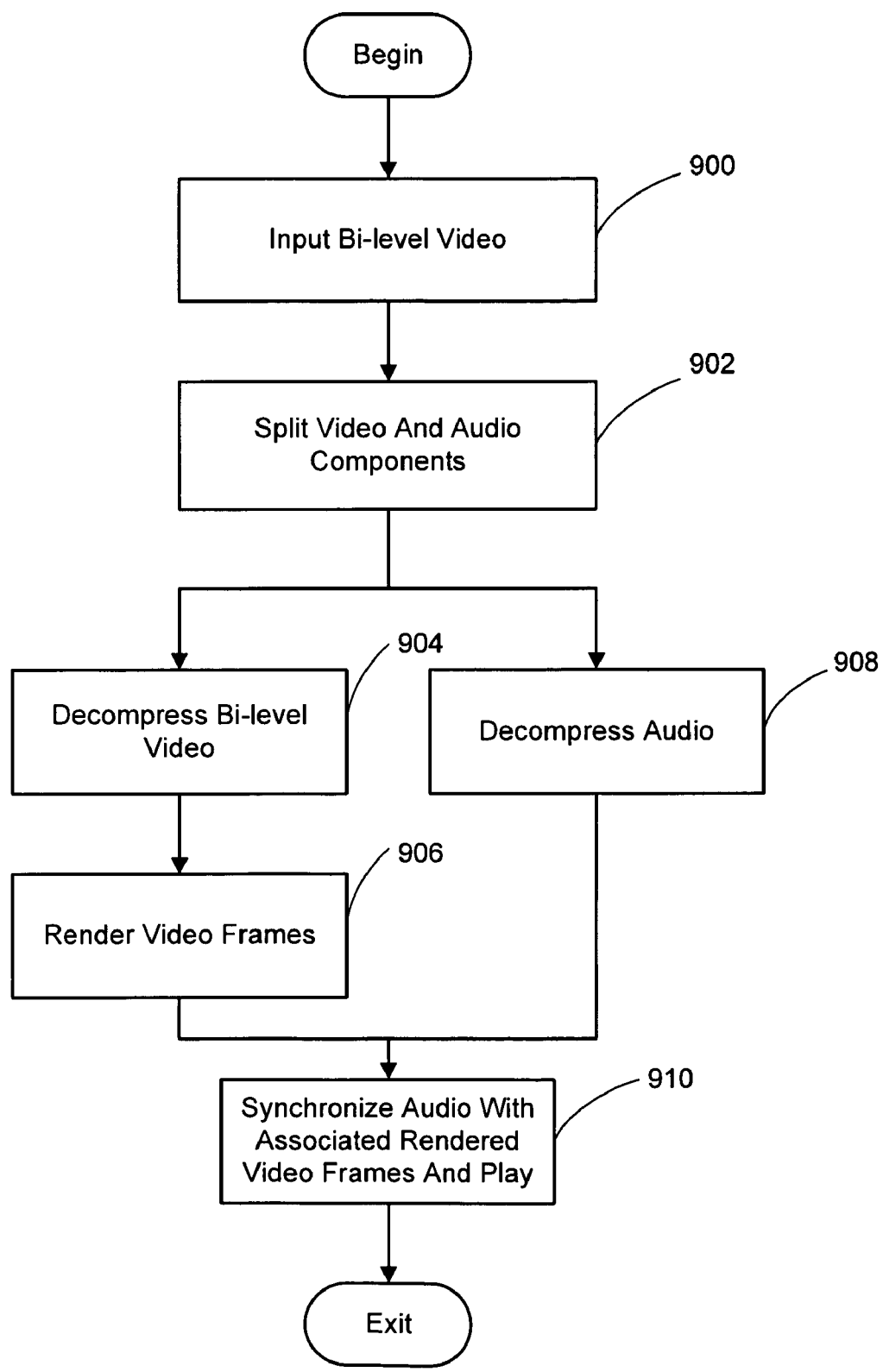
FIG. 9 is a flow chart diagramming an overall process for playing a bi-level video according with the present invention.

The process for playing a bi-level video generated in accordance with the present invention will be described in reference to FIG. 9. The playing process begins by receiving the transmitted bi-level video (process action 900). This will entail either receiving a bi-level video file, or a bit stream containing the video data. As discussed previously, the bi-level video will have been encoded for transmission over the desired medium. For example, it might have been packetized for transmission over the Internet in video broadcast or communication applications. Thus, the task of receiving a bi-level video includes unpacking the data using the standard unpacking technique appropriate for the transmission medium. Next, the bi-level video data is split to separate its audio and video components (process action 902), if applicable. This results in compressed bi-level video image frame data and an associated audio data component. A conventional AVI splitter can be used to accomplish this task.

The video image frame data will preferably be in a compressed form, and so must be decompressed before being played. As discussed previously, the image frame data under consideration was preferably compressed via the very low bit rate bi-level video coding process described in Section 2. If so, the image frame data is decompressed with a bi-level video decompressor applicable to the aforementioned very low bit rate bi-level video coding scheme (process action 904). Essentially, this decompressor is an adaptive, context-based, arithmetic decoding module. However, it is noted that the decoding module is configured to decode using any of the probability tables discussed above in connection with the coding of the bi-level video. The particular table used to code the data is identified by the decoder in the bit stream or data file associated with the compressed video or generated by the same procedure as in the encoder. In addition, the decoding module is configured to employ the same two-frame template used in the encoding process described above.

Further, since the encoded bi-level video preferably includes both I-frames and p-frames as described previously, before any decoding takes place the decoding module designates the first bi-level image frame received, and frames in the frame sequence occurring at the aforementioned prescribed interval, as I-frames. Those bi-level image frames in the frame sequence falling between a pair of consecutive I-frames are designated as p-frames. The I-frames and p-frames are both decoded using the adaptive context-based arithmetic decoding technique and the probability table identified for that frame in the incoming data. However, while the bit stream data associated with an I-frame represents all the pixels in the overall bi-level image frame, the data associated with a p-frame represents only those pixels contained within the previously-described bounding box associated with that p-frame. Accordingly, when the decoding module decodes a p-frame, the location and size of the bounding box in the overall bi-level image frame of a p-frame are read from the incoming data associated with that p-frame. The decoding module then can reconstruct the portion of the overall bi-level frame outside the bounding box by assuming the pixel values in that region are the same as the correspondingly located pixels in the last frame preceding the p-frame being decoded.

As the bi-level video image frames are decoded, they are rendered for display by the receiving device (process action 906). This is accomplished using the standard rendering procedure appropriate for the receiving device.

Concurrently with the decompression and rendering of the bi-level video image frames, the audio components of the frames are also processed. The audio decompression is accomplished using a method appropriate for the method used to compress it. Since the audio data was preferably compressed using the previously-described very low bit rate audio compression methods, this last action will entail decompressing audio data compressed using a decompression technique appropriate for the very low bit rate audio compression method employed (process action 908). Once decompressed, audio component associated with each bi-level video frame is synchronized with that frame (process action 910) and both are "played" (process action 912).

2. Generating and Playing Sketch Video

As with the process for generating bi-level video, the process of generating sketch video is preceded by obtaining or capturing an input video that will typically contain both audio and video components. Again, the input video can be either a color video or a gray-scale video. In addition, the video could be initially captured with a digital video camera. In that case, the video can be input directly, via an appropriate interface, into a computing device that is to be used to encode it. Alternately, the video could be captured using a non-digital camera, and then digitized via conventional methods before being input into the computing device for encoding. In a video broadcast application, the video capture process could be either real-time or offline, while in a communication application, the video capture process must be real-time.

Figure 10:
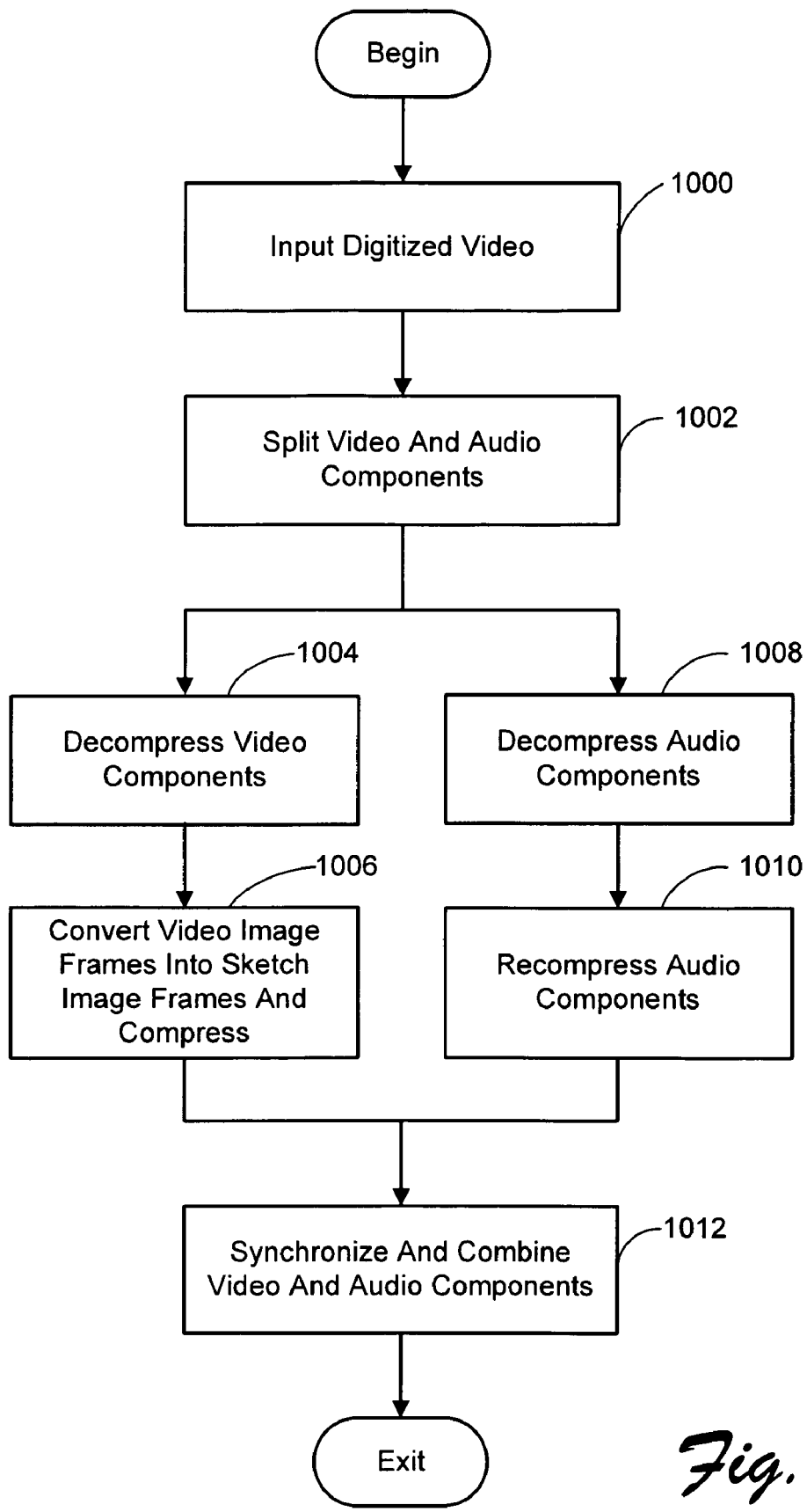
FIG. 10 is a flow chart diagramming an overall process for generating a sketch video according with the present invention.

The sketch video generating process begins just as it did in the generation of bi-level video described previously. Specifically, referring to FIG. 10, the aforementioned digitized full-color or gray scale video is input (process action 1000). The input video is then split into its audio and video portions (process action 1002). The splitting can be accomplished using any conventional audio-video splitting method. Typically, the input video will have been compressed using some conventional video compression process. Thus, once split, the video portion of the frame, which constitutes image frames of the video, is decompressed if necessary (process action 1004). Standard decompression techniques are employed for this task and will depend on the process used to initially compress the input video. It is noted that since this last action is performed only when the input video is compressed, it is an optional step.

Next, the video image frames are converted into sketch image frames and compressed (process action 1006) using a unique coding system and process, which will be described in detail in Section 2.1. This portion of the process is very different from coding associated with generating a bi-level video. However, while the video components of the input video frames are being decompressed, and then recompressed, the audio component of the frame can be processed concurrently. This procedure is the same as that employed in the generation of bi-level video. Specifically, the processing of the audio component of each input video frame entails decompressing the audio data if necessary using standard methods specific to the type of audio compression used to compress the data (process action 1008). Preferably this decompression would also include a standard noise reduction procedure. The audio data is then recompressed (process action 1010). In this case it is preferred that a very low bit rate audio compression method be employed to minimize the amount of data that must be transmitted. Some currently available examples of this type of audio noise compression were identified previously in connection with the generation of bi-level video in accordance with the present invention.

After the video part of sketch video has been generated and compressed, and the audio data has been compressed, the audio and video components are synchronized and combined to produce a complete sketch video, as indicated by process action 1012. Any appropriate existing AVI multiplexing technique can be used for this purpose, such as AVI Mux in Microsoft DirectMedia 6.0. The completed sketch video can be in the form of a video file or can take the form of a bit stream. The video file can be used in a broadcast application where the broadcast of the video is to take place sometime after its generation. The bit stream from of the video could be used for an immediate broadcast application, or for a video communications application. It is noted that in the case of the bit stream, the sketch video generation process can be viewed as a sequential process with the foregoing actions being performed on each frame or a group of frames of the input video. As portions of the overall sketch video are generated, they are transmitted thus creating the aforementioned bit stream.

In order to transmit the sketch video over a network to a receiving device, either from a previously generated file or as a real time bit stream, the video data will typically have to be prepared first using a packetizing technique applicable to the transmission method. For example, if the sketch video is to be transmitted over the Internet, the data would be packetized via Internet protocols.

2.1. Sketch Video Image Frame Coding

Figure 11:
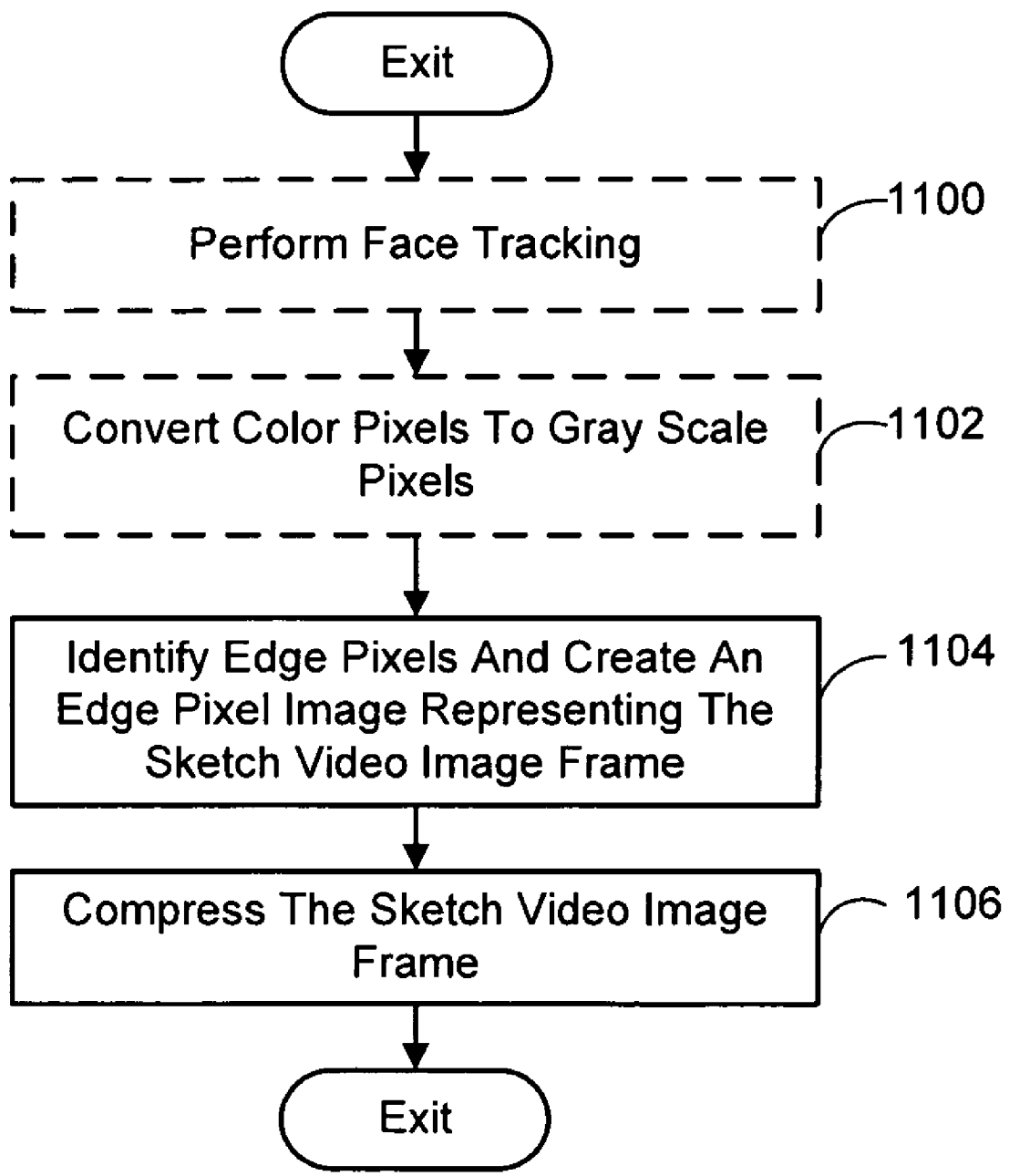
FIG. 11 is a flow chart diagramming a process for encoding the image frames of an input video to create a sketch video as part of the overall process of FIG. 10.

The sketch image frame encoding process generally begins by transforming the image portion of each frame of the input video into a bi-level video frame and then a sketch video frame. Specifically, referring to FIG. 11, the first action is an optional action—namely a face tracking procedure (process action 1100). This procedure is advantageously used where the video being encoded consists of a person speaking, such as in a video of a lecture or speech. Typically, only the speaker is of interest, and not the background. Thus, an opportunity exists to eliminate some of the video data that must be encoded and transmitted by eliminating this unwanted background. Any appropriate face detection and tracking technique can be employed for the foregoing purpose. However, it is preferred that the technique used scale the resulting face region of the speaker so as to fill substantially the entire image frame.

Next, the input video image frame is converted from color to gray scale, if it was originally captured in color (process action 1102). The converted image frame (or the original image frame if initially captured in gray-scale), then undergoes an edge detection procedure in which the edge pixels of the objects depicted in the image frame are identified (process action 1104). The resulting edge pixel image represents the aforementioned sketch image frame. Any appropriate existing edge detection method can be employed for this purpose. It should be noted that edge detection procedure could alternately be applied to the original color image frame if desired.

The sketch image frames could be transmitted as is, however, it is preferred that they first be compressed to further reduce the bandwidth required to transmit the resulting video (process action 1106). One method that could be employed to compress the sketch image frames involves using JBIG, MPEG shape coding or the aforementioned bi-level video coding. For example, bi-level video coding procedure could be performed on each sketch image frame to reduce the amount of data that must be transmitted. It is noted that the sketch image frame is essentially a special case of a bi-level image. As such other compression methods applicable to bi-level images could also be implemented. This would include lossy methods as long as any resulting degradation in the resolution of the decoded frame is acceptable to the user.

Figure 12:
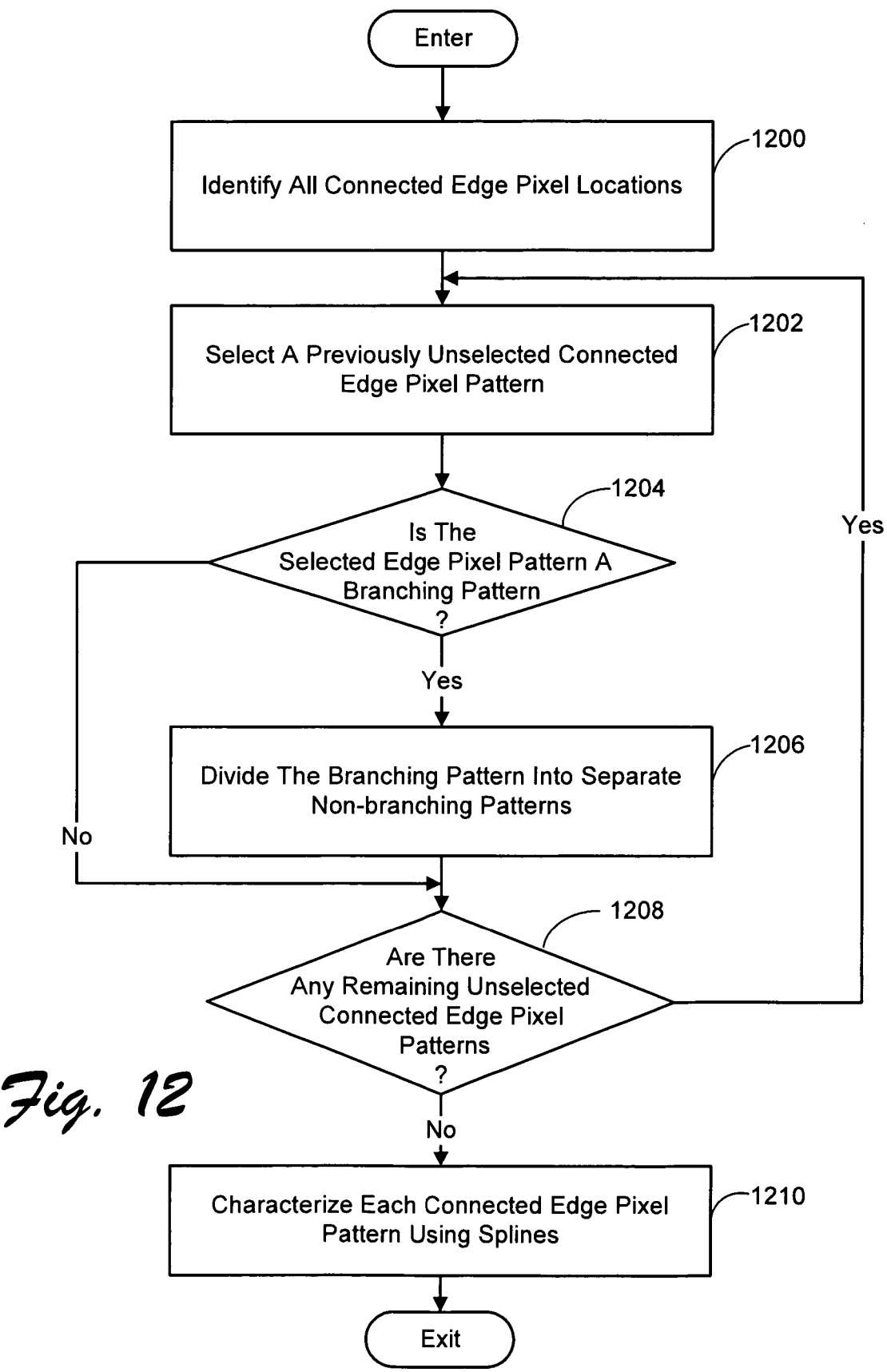
FIG. 12 is a flow chart diagramming a process for the vectorization compression technique optionally implemented as part of the overall process of FIG. 11.

Another type of compression methods that could be used involves vectorizing the sketch image frames. This vectorization process is outlined in FIG. 12. The first action 1200 in the vectorization process is to scan each image frame in turn, pixel by pixel, to identify all "connected" edge pixel locations. Preferably, only those edge pixel that are found to be adjacent to each other horizontally, vertically or diagonally (i.e., a 8-connected region) are identified. In some cases the scan identifies patterns of connected edge pixels that include one of more branches. These branching patterns are preferably segmented. Accordingly, the next action 1202 in the vectorization process is to select a previously unselected one of the connected edge pixel patterns. A connected edge pixel pattern is one in which all the edge pixels are adjacent to at least one other edge pixel. It is then determined whether the currently selected pattern is a branching pattern, as indicated by process action 1204. A branching pattern is one where at least one of the edge pixels is adjacent to more than two other edge pixels. If the selected pattern is a branching pattern, it is arbitrarily divided into separate non-branching connected patterns (process action 1206). Next, it is determined if there are any remaining previously unselected patterns (process action 1208). If so, then process actions 1202 through 1208 are repeated for each remaining unselected pattern. Once the connected edge pixel patterns are defined, the next phase of the vectorization process is to characterize each of the patterns using spline techniques (process action 1210). In this way, each of the patterns are characterized by a spline and its associated set of control point locations which correspond to certain pixel locations. In tested embodiments of the vectorization process, Bezier splines were employed. However, other types of splines can be use, such as B-splines. A mixture of different splines could also be employed as some spline types will characterize certain patterns better that others. If a mixture of splines is used, then an indicator identifying the spline type would be included with the control point data associated with each pattern to facilitate the decoding of the vectorized image frame.

The vectorized sketch video can also be represented by I-frames and p-frames. For each I-frame, the hierarchy of splines and the positions of all the control points of splines are recorded and compressed using conventional coding methods such as Huffman coding. For each P-frame, only the differences of hierarchy or topological structures between current frame and previous frame and shift of control points of splines are recorded and compressed using conventional coding methods such as Huffman coding.

While the video component of the input video is decompressed, converted and then recompressed, the audio component of the input video can be processed concurrently. The processing of the audio component entails decompressing the audio data using standard methods specific to the type of audio compression used to compress the data. Preferably this decompression would also include a standard noise reduction procedure. The audio data is then recompressed. In this case it is preferred that a very low bit rate audio compression method be employed to minimize the amount of data that must be transmitted.

After the compressed sketch video has been generated, and its associated audio data has been compressed, the audio and video components are synchronized and combined to produce a complete sketch video. This completed sketch video is ready to be transmitted. Transmitting the video entails packaging the sketch video using the packetizing technique applicable to the transmission method. For example, if the sketch video is to be transmitted over the Internet, the data would be packetized via Internet protocols.

2.2 Playing the Sketch Video

The broadcasted sketch video generated in accordance with the foregoing encoding process is processed by a receiving device. The receiving device "plays" the sketch video by decompressing it and then displaying the decompressed image frames in sequence. In addition, if the receiving device has sound producing capability (such as via a speaker, or an audio output connected to a earphone or the like), the receiver will also decompress and play the audio components of each frame of the sketch video. To take full advantage of the present invention, the receiving device itself is preferably one of the previously mentioned low bit rate devices such as a hand-held PC, palm-sized PC, or mobile telephone. However, it is not intended to limit the invention to such devices. Rather, in general, a sketch video can be played on any device having a processor capable of decoding the incoming video data and a display capable of displaying bi-level images, regardless of its bandwidth capability.

Figure 13A:
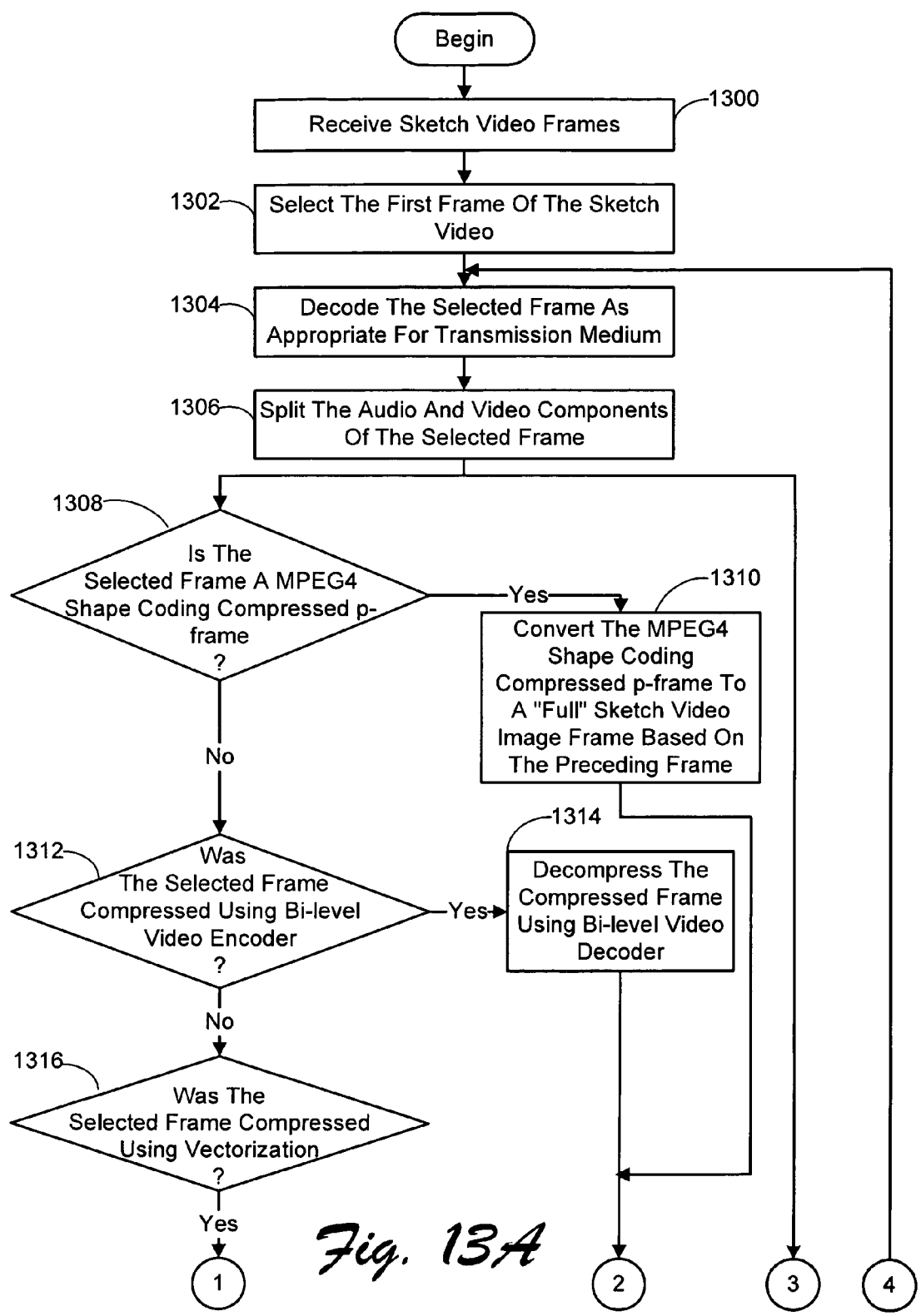
FIGS. 13A and 13B depict a flow chart diagramming a process for decoding a sketch video in accordance with the present invention.
Figure 13B:
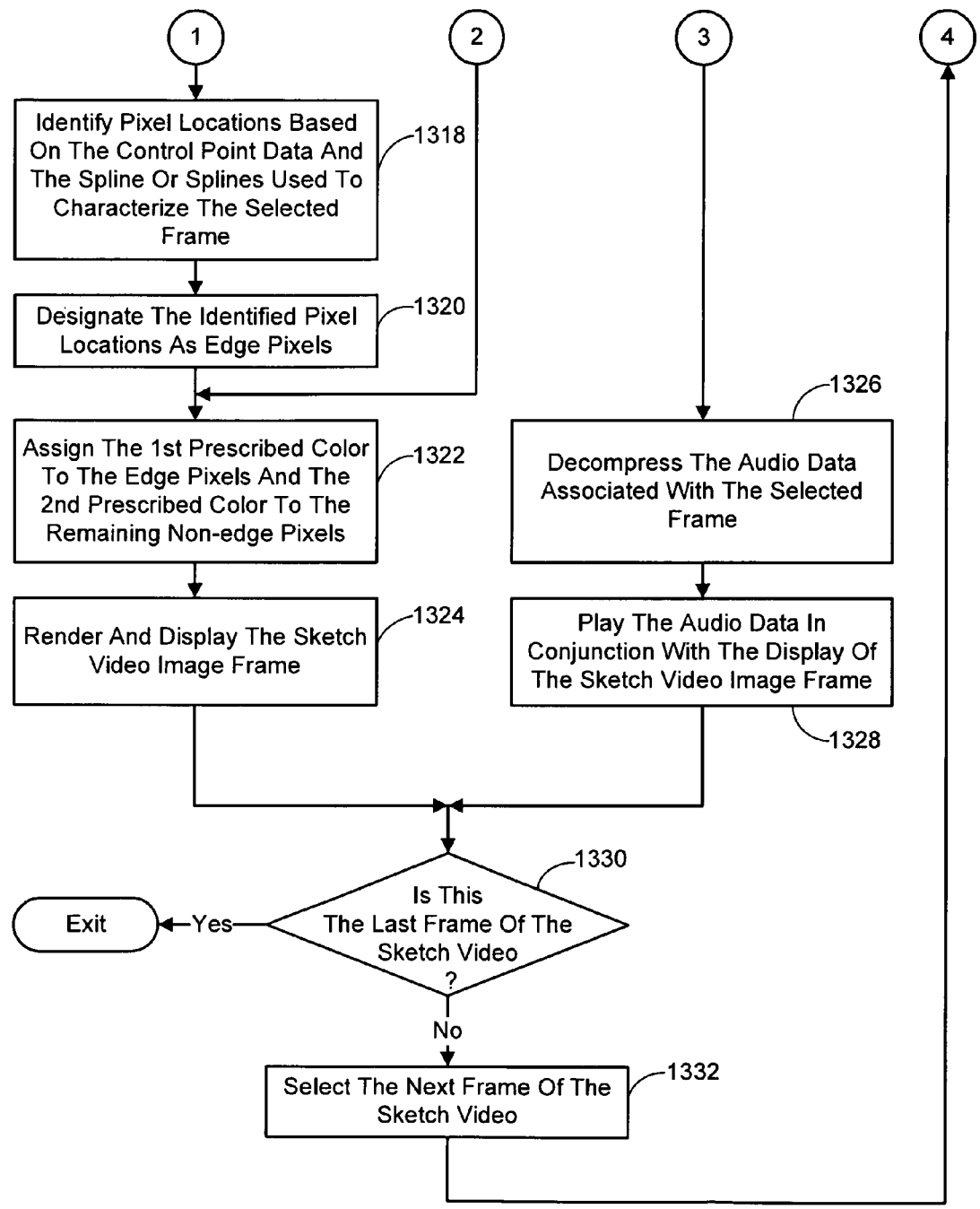

The process for decoding a sketch video generated in accordance with the present invention will be described in reference to FIGS. 13A and 13B. The decoding process begins by receiving the broadcasted sketch video (process action 1300) and selecting the first frame of the video (process action 1302). The first action can be performed by receiving the entire video and storing it in the receiver, or more practically, receiving and processing each frame of the sketch video on an ongoing basis. As discussed previously, the sketch video will have been packetized for transmission over the desired medium. For example, it might have been packetized for broadcast over the Internet or for transmission to a mobile telephone. Thus, the task of playing a sketch video includes unpacking the data using the standard unpacking technique appropriate for the transmission medium (process action 1304). Next, the sketch video frame data is split to separate its audio and video components (process action 1306). This results in a sketch video image frame and an associated audio component. A conventional AVI splitter can be used to accomplish this task.

The sketch video image frames will preferably be in a compressed form, and so must be decompressed before they can be played. As discussed previously, the image frame under consideration may have been compressed via a MPEG4 shape coding technique. Thus, the first decompression action is to determine whether the selected sketch video frame is a MPEG4 shape coding compressed p-frame, as indicated by process action 1308. If it is, then the p-frame is converted into a "full" sketch video frame based on its previously received frame (process action 1310). Standard MPEG4 shape coding decoder is employed for this purpose. Of course, this step will be skipped in the case of the first frame of the sketch video since it will be an I-frame, and for any subsequently received I-frame. It should also be noted that if MPEG compression is never employed during the encoding of the sketch video, the last two process actions (1308 and 1310) could be eliminated.

Next, it is determined in process action 1312 whether the sketch video frame was compressed using a bi-level video encoder. If the sketch video image frame was compressed using a bi-level video encoder, then each image frame is decompressed using the standard decompression procedure associated with the compression technique employed (process action 1314). However, if the sketch video image frame was not compressed using a bi-level video encoder, it is determined whether it was compressed using the previously-described vectorization procedure (process action 1316). If so, the image frame is decompressed as follows. Essentially, the sketch image frame is reconstructed based on the spline and its associated control points that were used to respectively characterize the connected edge pixel patterns of the original image. This entails using each set of control points and the spline employed to generate them to identify a series of pixel locations in the reconstructed image frame (process action 1318). These pixel locations are designated as the edge pixels (which define the sketch image frame) as indicated by process action 1320. It is noted that if a mixture of different spline types were employed to characterize the various edge pixel patterns in the sketch image frame being decompressed, then the incoming image data will include an indicator of the type of spline that was used to generated the corresponding control points for each characterized pattern. In such a case, the receiver will first identify the type of spline employed before computing the edge pixel locations for the characterized pattern in the reconstructed sketch image frame. If a single spline type was used to characterize each edge pixel pattern in the image frame, then the just-described indicator method can be employed, or the receiver can simply be programmed to always employ the particular spline type associated with the incoming vectorized image frames.

It is noted that while compressing the edge pixel images constituting the sketch video using a bi-level image compression technique or vectorization is preferred, it could be skipped in the encoding process. In such a case, it will be determined that neither compression method was used and the decoding process will continue as indicated in FIG. 13B. Further, the non-MPEG4 shape coding decompression phase of the decoding process has been described as assuming that the incoming sketch video was compressed using either the bi-level image or vectorization techniques (or neither). However, it may be decided that only one of the techniques will be employed in the encoding of the sketch video. If this is the case, the process actions associated with detecting and decompressing the unused technique can be eliminated from the decoding process. Thus, it would be determined if the prescribed compression process had been employed. If it had, then the appropriate decompression actions would be taken. If the prescribed compression technique was not employed, it would be assumed no compression was implemented and the decoding process would proceed without performing any decompression actions.

The last action 1322 of the decoding process involves assigning a first of two colors chosen for displaying the sketch video to each of the previously designated edge pixels, and assigned the other of the two colors to the remaining pixels not designated as edge pixels. As with the bi-level images frames encoded using the previously-described very low bit rate bi-level video coding technique, the preferred choices for the first and second sketch video colors are black and white, respectively. However, it is not intended to limit the invention to just black and white pixels. Rather, like the very low bit rate bi-level video coding technique, other colors could also be chosen as desired. The first of the two chosen colors would preferably be the darker of the two. In addition, the second color should contrast the first to the extent that the two colors are readily discernable to a person viewing the sketch video.

Once the sketch video image frame has been decoded, it is rendered and displayed by the receiving device (process action 1324). This is accomplished using the standard rendering procedure appropriate for the receiving device.

Concurrently with the decompression of the sketch video image frames, the audio components of the frames are also processed. This entails first decompressing the audio component of the selected sketch video frame, as indicated by process action 1326. The audio decompression is accomplished using a method appropriate for decompressing audio data compressed using the previously-described lowest bit rate audio compression method. Once decompressed, each audio component is played in conjunction with the display of the sketch video image frame associated with the audio component (process action 1328).

The foregoing decoding, rendering and display process is repeated for each of the remaining frames of the sketch video received. Specifically, it is first determined if the currently selected frame is the last frame of the sketch video, as indicated by process action 1330. If it is not the last frame, then the next frame of the sketch video is selected (process action 1332) and actions 1304 through 1332 are repeated as appropriate. This continues until the last frame of the sketch video is received and processed.

3. Broadcast with Bi-Level or Sketch Video

Broadcast using a bi-level video generated in accordance with the foregoing procedures involves at least one sender and one receiver. The sender or receiver can be one of the previously mentioned low bit rate devices such as a hand-held PC, palm-sized PC, or mobile telephone. Although, in general, the sender or receiver can be any device having a processor capable of coding and decoding the incoming video data respectively, regardless of its bandwidth capability, such as for instance a desktop PC or laptop PC.

Figure 14:
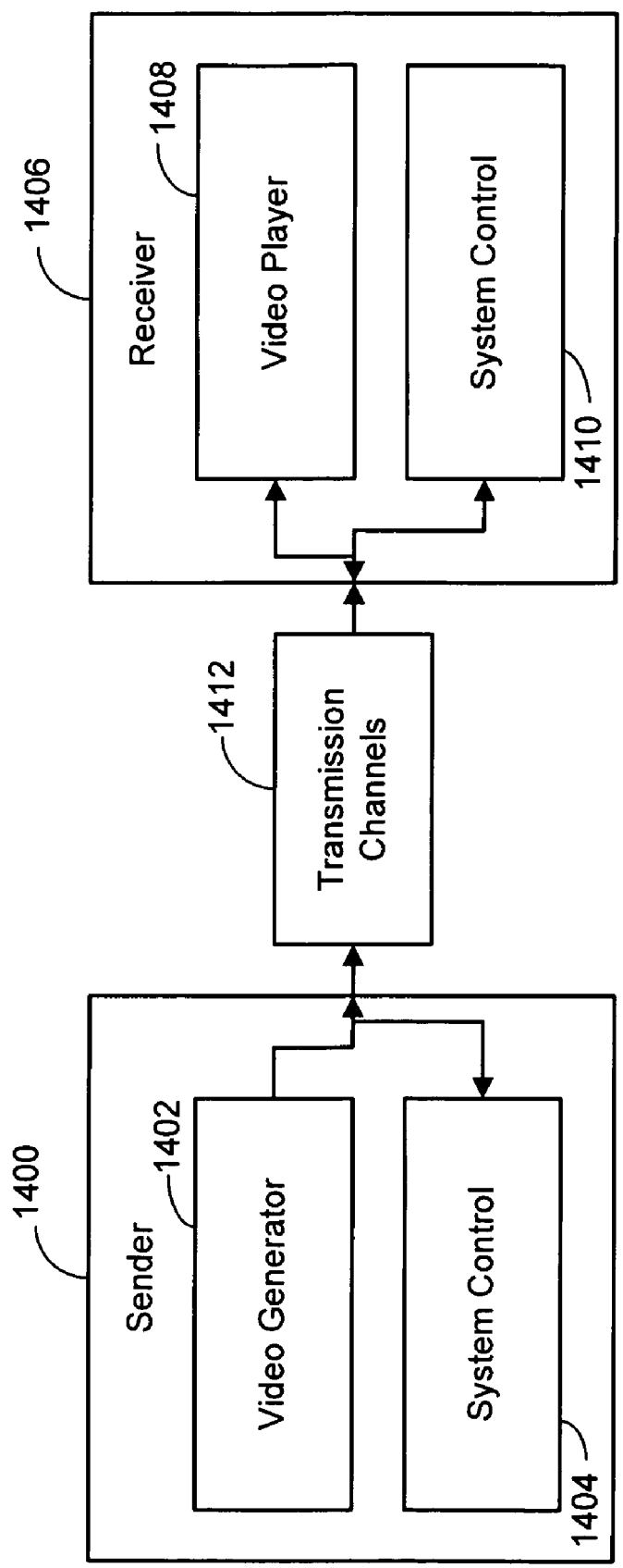
FIG. 14 is a block diagram illustrating a bi-level or sketch video broadcast system and the structures of its components such as a sender and receiver.

As illustrated in FIG. 14, the sender 1400 is composed of a video generator module 1402, which can be the bi-level video generator described in Section 1 above or the sketch video generator described in Section 2. The sender 1400 also includes the conventional system control parts 1404 typical of such a device [6, 7, 8]. The receiver 1406 is composed of a video player module 1408, which can be the bi-level video player described in Section 1.2 or the sketch video player described in Section 2.2, as well as the conventional system control parts 1410 typical of such a device [6, 7, 8]. Bi-level or sketch videos are transmitted via conventional transmission channels 1412. The transmission channels 1412 could be wired or wireless local area networks, or wired or wireless wide area networks (such as the Internet) that can connect senders 1400 and receivers 1406. Besides one sender and one receiver, there can be multiple senders and multiple receivers connected to transmission channels. Therefore, each sender could send bi-level or sketch video to multiple receivers and each receiver could subscribe to multiple senders. In broadcast application, the video capture process could be either real-time or offline.

4. Communication with Bi-Level or Sketch Video

Communication with bi-level or sketch video is consists of at least two communicators connected to conventional transmission channels. The communicator can be one of the previously mentioned low bit rate devices, or more powerful devices such as a desktop PC or laptop PC. In general, the communicator can be any device having a processor capable of decoding the incoming video data and at least coding audio, regardless of its bandwidth capability.

Figure 15:
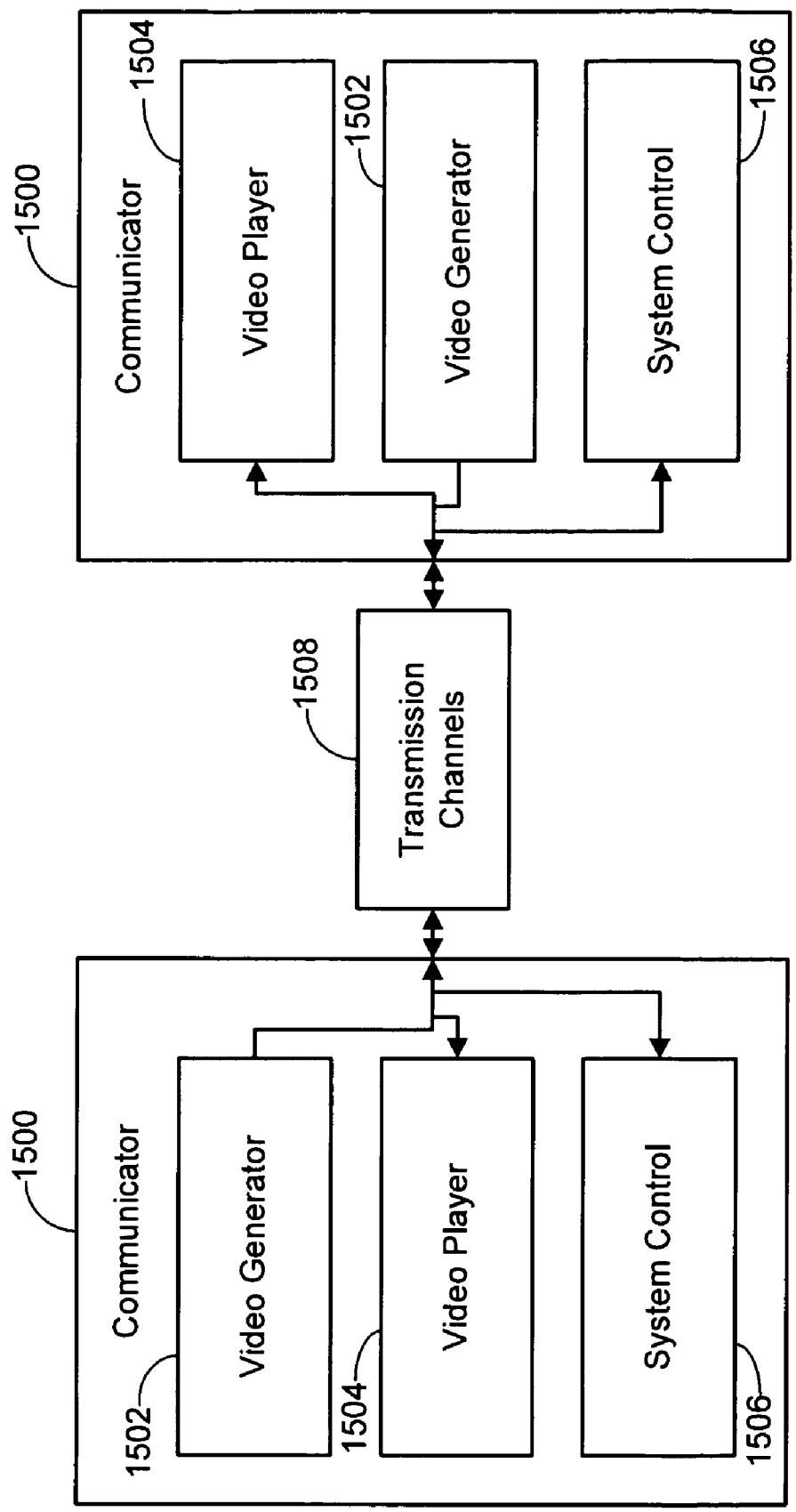
FIG. 15 is a block diagram illustrating a bi-level or sketch video communication system and the structures of its components such as a communicator.

As illustrated in FIG. 15, each communicator 1500 is composed of a video generator 1502, a video player 1504, as well as the conventional system control parts 1506 of a communicator [6, 7, 8]. Bi-level or sketch videos are transmitted via the transmission channels 1508. Here again, the transmission channels 1508 could be any channels such as wired or wireless local area networks, or wired or wireless wide area networks (such as the Internet), that can connect communicators. There can also be multiple communicators connected to transmission channels. Therefore, each communicator could send bi-level or sketch video to any other communicators or receive bi-level or sketch video from any other communicator. In some cases, communicators possess both audio and video capture and sending capacity, and can send and receive both of audio and video. A bi-level video phone is an example of such a device. In some other cases, communicators may only possess either audio capture and sending capacity or video capture or sending capacity, and so can receive both of audio and video but can only send either audio or video. In one embodiment of the invention, the communicators are embodied in PCs, which can send and receive both of audio and video. In another embodiment of the invention, the communicators are embodied in Pocket PCs that can receive both of audio and video but can only send audio. All of these kinds of communicators can be connected to transmission channels and communicate with each other.

5. Bi-Level and Full-Color Video Combination for Video Communication Across a Wide Range of Bandwidth Conditions Full-color video encoding produces high quality video images but generally requires a high data throughput bit rate on the network being used to avoid undesired color blockiness and discontinuous motion between scenes during video playback, as described in the Background section. In contrast to full-color video, bi-level video possesses lower image quality, but can be transmitted at low bit rates data (i.e., in low bandwidth conditions) without resulting in the undesirable video defects associated with full-color video in the same low bit rate conditions. In view of such advantages and disadvantages, system 100 combines bi-level and full-color video data so that the respective encoders can be utilized at their respective suitable bandwidth ranges.

In particular, system 100 selectively switches between bi-level and full-color (DCT) encoding schemes to generate combined bi-level/full-color video data for transmission to an end-user. For purposes of discussion, the remote computer 180 of FIG. 1 represents such an end-user (e.g., a portable communication device, a laptop, a desktop PC, etc.). The system 100 performs the encoding as a function of estimated network bandwidth conditions and a novel switching scheme. Such a network is represented, for example, by the LAN 171 and/or the WAN of FIG. 1. The switching scheme stops transmission of one type of video and begins transmitting a different kind of video in a manner that ensures considerably smooth (non-jumpy) transitions between the different encoding algorithms. In this manner, a combination bi-level/full-color/gray-scale video is produced with continuous playback/decoding characteristics.

System 100 utilizes the estimated bandwidth condition(s) to determine which one of the two types of encoders (bi-level or full-color) will be used to encode the video data. The greater the estimated bandwidth, the greater the bit rate that the network can support. The lower the estimated bandwidth, the smaller the transmission bit rate that the communication network can support. In view of this, system 100 selects the encoder with a corresponding bit rate that is substantially suitable in view of the estimated available bandwidth. Since full-color encoding (DCT) results in a substantially high bit rate, and bi-level encoding results in a substantially low bit rate, full-color encoding can be used when there is sufficient bandwidth and bi-level encoding can be used in low bandwidth conditions (e.g., <33 Kbps).

5.1 Bandwidth Estimation for Bi-Level Video Communication

To deliver acceptable video quality over a network with a given bandwidth at a given time, the amount of available bandwidth available at the given time is estimated. Considering the real-time characteristic of system 100, among various bandwidth estimation and network congestion control approaches the receiver (e.g., the remote computing device 180 of FIG. 1) feedback approach is adopted. In this approach, reports fed back by the receiver in a specific time interval contain information of the number of lost packets and timestamps. After obtaining the receiver's reports, the sender (system 100 of FIG. 1) estimates the state of the network and makes adjustment decisions by performing the following operations:

Feedback analysis: The statistic of packet loss and round-trip time (RTT) is computed.

Network state estimation with loss and delay: the actual network state (e.g., unloaded, loaded or congested) is determined.

Bit rate adjustment: the allowed bit rate is adjusted in terms of the network state.

Figure 17:
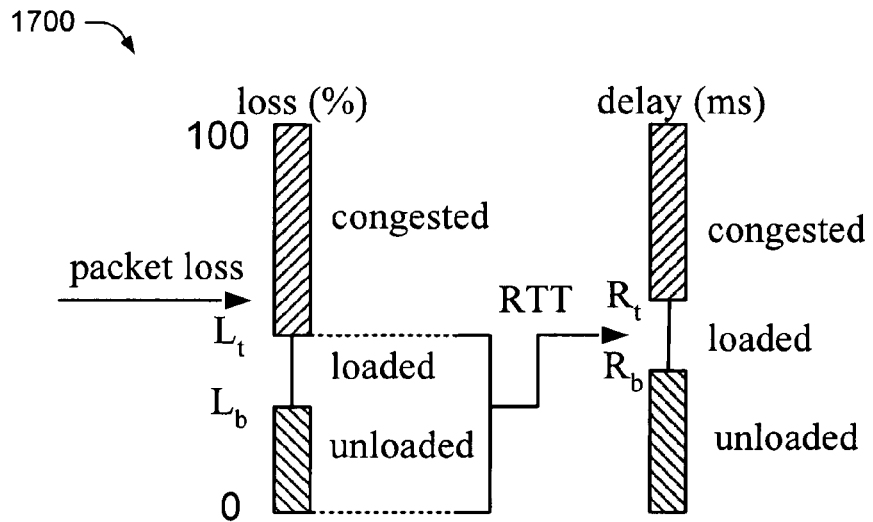
FIG. 17 shows exemplary network state estimation(s) for determining a suitable target bit rate to transmit different types of video data. Such network states include, for example, unloaded, loaded, and congested states.

FIG. 17 shows exemplary network state estimation(s) for determining a suitable target bit rate to transmit bi-level video data. Such network states include, for example, unloaded, loaded, and congested states. As shown in FIG. 17, the lower threshold $L_b$ of packet loss is set so that data transmission may suffer from packet loss but is still acceptable (e.g., results in acceptable encoded video playback) and the upper threshold $L_t$ is selected to indicate congestion if the damage done to video quality resulting from packet loss is severe. Similarly, the upper threshold $R_t$ is chosen as a maximum value so that the delay of video will not be easily perceived during video playback. On the other hand, the loaded zone should be large enough, i.e. the lower threshold Rb should be set low enough, to avoid oscillations. In this implementation, suitable values for the video source of system 100 are $L_t$=4%, $L_b$=2%, $R_t$=1200 and $R_b$=700.

After estimating network states, the network states are mapped to decisions to respectively decrease, maintain (hold), or increase the video transmission rate.

With a view to the characteristic of real-time communication, the video source should reduce its throughput rapidly in the case of congestion and additive increase should be adopted to probe the available bandwidth in the case of unload. In view of this, a multiplicative factor of γ is utilized to reduce the allowed bit rate, and value λ is used to increase the allowed bit rate. The values of γ and λ are configurable as a function of how quickly bandwidth conditions are to be changed (i.e., respectively decreased or increased). This determination is a function of the particular implementation of the network being used to transfer the video data to the end-user. Thus, although this particular implementation utilizes γ=0.8, and λ=2 kbps, other values could be utilized based on different network conditions.

5.2 Bi-Level/Full-Color Video Switching

Before describing an exemplary bi-level/full-color switching implementation, we revisit the bi-level video rate control scheme of section 1.1.5. The described bi-level video rate control scheme is realized using two factors: (1) the threshold of the difference between corresponding pixel regions in two successive frames, called the dissimilarity threshold and (2) the width of the threshold band. As the dissimilarity threshold increases, pixels are increasingly viewed as being similar to corresponding pixels in the previous frame, and therefore the lower bit rate the generated bit stream. As the threshold band gets larger, more pixels are coded according to the predicted probability, thus the lower the generated bit stream bit rate. If these thresholding techniques do not adequately reduce the bit rate in view of low bandwidth conditions, frame dropping is employed to further reduce the bit rate.

There are two major differences between the described rate control schemes of bi-level video coding and DCT based full-color video coding. The first is that in DCT based coding, the quantization parameter can be calculated according to an encoder rate distortion function, but, in bi-level video coding, no such distortion function exists. The only way is to increase or decrease the combination of the above two factors. The second is that in DCT based coding, both buffer overflow and underflow need to be prevented, but due to the low bit rates of bi-level video, buffer underflow is inevitable and therefore is allowed. The consequence of this feature is that the generated bit rate of a bi-level video may not be as high as the target bandwidth. In view of this, a novel bandwidth capability probing scheme is utilized to ensure that the most suitable video is generated in view of the available bandwidth conditions at any given time.

The bandwidth capability probing scheme is developed based on the bandwidth estimation algorithm described above in section 5.1. The bandwidth estimation algorithm indicates a current data throughput status of the network. Bi-level video bit rates are typically much smaller than full-color video bit rates. Additionally, it has been determined that there is a bandwidth gap between the bit rate of a bi-level video and a switch threshold for transmitting acceptable full-color video. Since the bandwidth estimation scheme indicates only current network status, and not how much additional bandwidth the network possesses, redundant data is periodically sent to the receiver to more fully determine, or "probe" the network's bandwidth capabilities. For purposes of discussion, redundant data can be any data, for instance, useless data that is used to increase the output bit rate to determine or "probe" whether the network is congested. The redundant data is not the video data that is to be presented at the end-user. The duration of single probing process is much shorter than the time interval between two successive probing processes so that normal video communication will not be disturbed.

The following criteria, which include the following equations, are used to calculate the allowed bit rates in bit rate decrease and bit rate increase cases respectively.

$$B_a^{i+1} = \max\{(B_o^i + B_s^i) \times \gamma, B_{min}\} \quad (5)$$

$$B_a^{i+1} = \min\{B_o^i + B_s^i + \lambda, B_{max}\} \quad (6)$$

$B_a^{i+1}$ is the allowed bit rate used in the next feedback interval (probing operation), $B_o^i$ represents the mean throughput in the time interval just past (output bit rate from the compression module), $B_s$ is the bit rate of redundant data in the current time interval, $B_s^i$ is the bit rate of the redundant data in that previous probing process, $B_{min}$ is the minimum allowed bit rate and $B_{max}$ is the maximum allowed bit rate.

Both formula (5) and formula (6) incorporate a factor ($\gamma$ or $\lambda$) to adjust the bit rate in view of potential error between estimated bandwidth and actual total available bandwidth. In other words, the bit rate output via the bi-level or full-color encoding algorithm might not actually match the total available bandwidth. To address such a disparity, and when the decision is to increase the bit rate in view of additional estimated bandwidth availability, the difference between the allowed bit rate and the actual output bit rate that could have been supported is added to the target redundant data bit rate of the in the next time interval. ($B_a^i$ is allowed bit rate, while $B_o^i + B_s^i$ represents the actual output bit rate). Thus, $B_s^{i+1}$ is computed as follows in Eq. (7):

$$B_s^{i+1} = \min\{B_a^i - (B_o^i + B_s^i), S_{max}\} \quad (7)$$

Otherwise, $B_s^{i+1}$, is set to zero (0), where $S_{max}$ is the maximum redundant bit rate.

Figure 18:
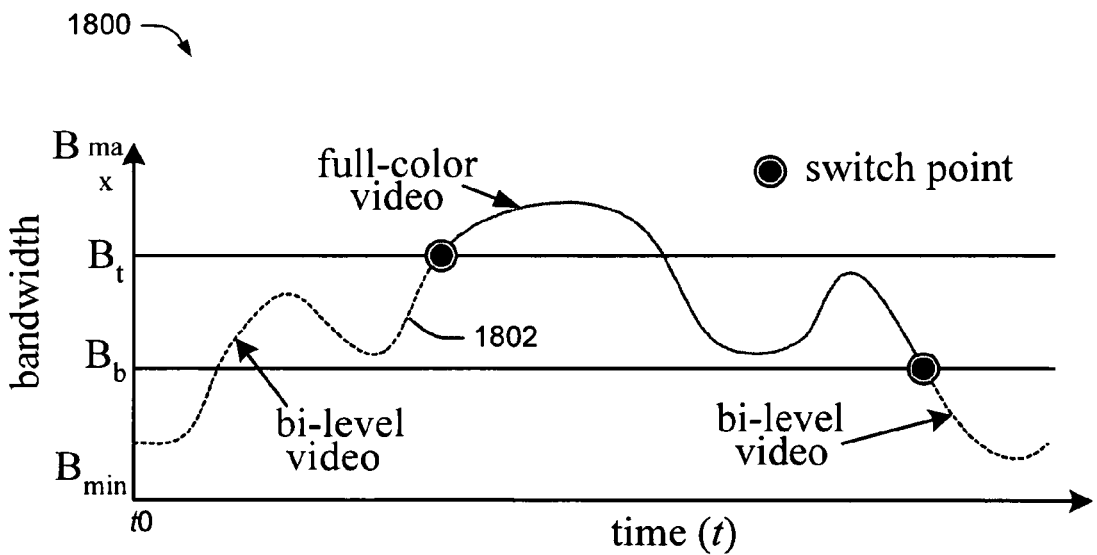
FIG. 18 illustrates use of exemplary bandwidth condition criteria for determining when to switch from bi-level to full-color video communication, and vice versa.

FIG. 18 illustrates use of exemplary bandwidth condition criteria for determining when to switch from bi-level to full-color video communication, and vice versa. The illustrated curve 1802 represents detected bandwidth over time (t). Two thresholds $B_b$ (bandwidth bottom) and $B_t$ (bandwidth top) are also shown. As shown in FIG. 18, from time t0, if the video is initially being encoded using bi-level encoding (bi-level mode) and the allowed bit rate $B_a$ increases to the lower end of the threshold band $B_b$, no switch takes place (i.e., bi-level video is not switched to full-color video). If estimated bandwidth increases and reaches the higher end of the threshold band $B_t$, bi-level video video is switched to full-color video. On the contrary, if the estimated bandwidth drops, any switching from full-color to bi-level video does not occur until $B_a$ is lower than $B_b$. Use of a threshold band as represented by the range of bandwidth values between and inclusive of $B_b$ and $B_t$, rather than a single threshold substantially to trigger video scheme switching, considerably avoids too frequent switching from one video scheme to the other, and/or vice versa, when available bandwidth fluctuates around the switch threshold.

Accordingly, decisions to decrease, hold (maintain current bit rate), or increase a current bit rate in view of estimated bandwidth conditions for communicating b-level video are used to calculate an allowable bit rate for the video encoder as indicated per equations (5), (6), and (7). Then, the video encoder adjusts the output bit rate targeting calculated allowable bit rate. When the allowable bit rate has met the higher end of the threshold band $B_t$ or the lower end of the threshold band $B_b$, the switch between bi-level and full-color video, or vice-versa, occurs.

Figure 19:
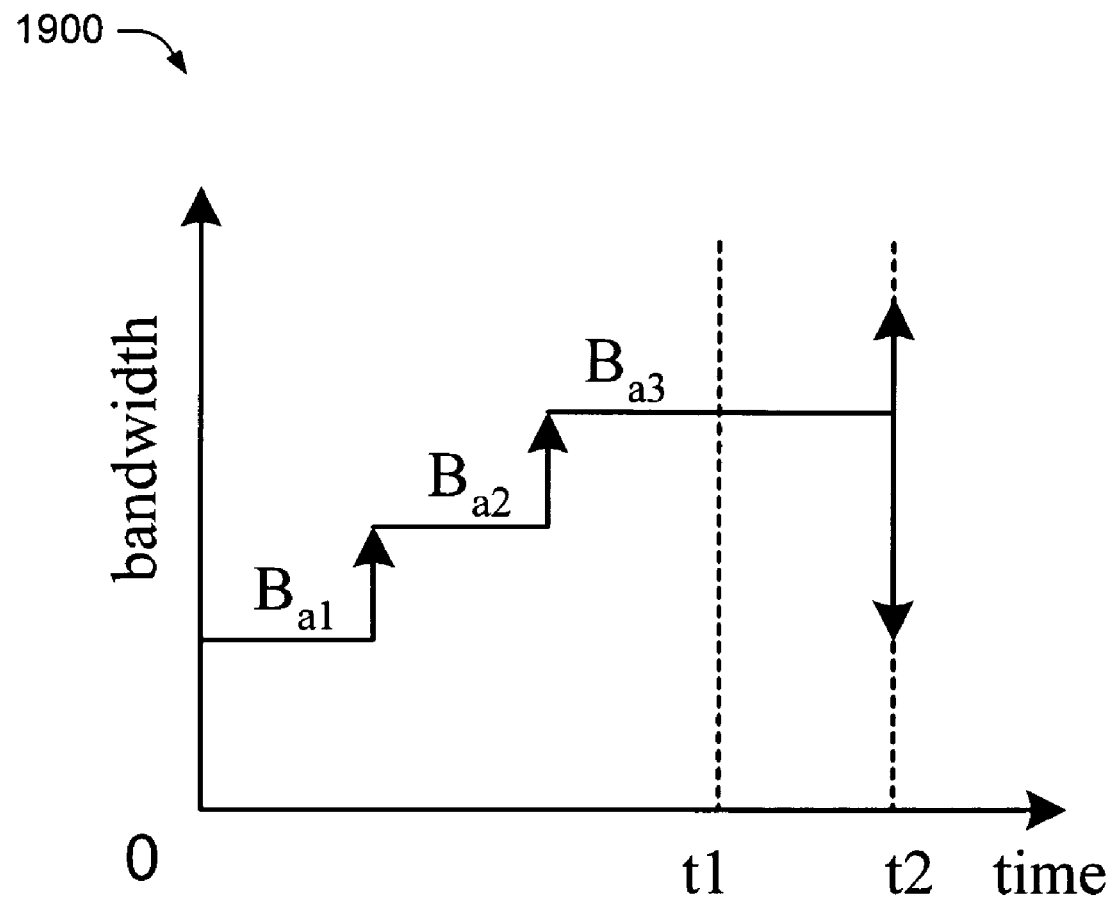
FIG. 19 shows exemplary use of network bandwidth probing operations to determine when to switch from bi-level to full-color video communication, and vice-versa, as a function of determined bandwidth conditions.

FIG. 19 shows exemplary use of network bandwidth probing operations to determine when to switch from bi-level to full-color video video, and vice-versa, as a function of determined bandwidth conditions. In this implementation, if a decision to decrease the current transmission bit rate is encountered (e.g., at time t1) for the first time, the current video scheme and redundant data transmission bit rates are not changed. Subsequently, if the next decision is to increase or hold the bit rate (e.g., at time t2) then the bit range is respectively changed as determined.

Otherwise, in view of a second determination to decrease the bit rate, the probing operation is immediately stopped and the allowed bandwidth for a next time interval (i) is reduced as follows:

$$B_a^{i+1} = \min\{B_o^i, (B_o^i + B_s^i) \times \gamma, B_{min}\} \quad (8)$$

Communicating video at a same bit rates in view of some number of sequential probing results is implementation dependent. In this implementation two (2) successive probing operations are used to determine whether the probing process should be stopped. This prevents the video communication and probing operations from being unnecessarily disturbed by random network conditions fluctuation/changes that should be non-determinative to the probing process.

5.3 Exemplary Bi-Level/Full-Color Switch Analysis

Figure 20:
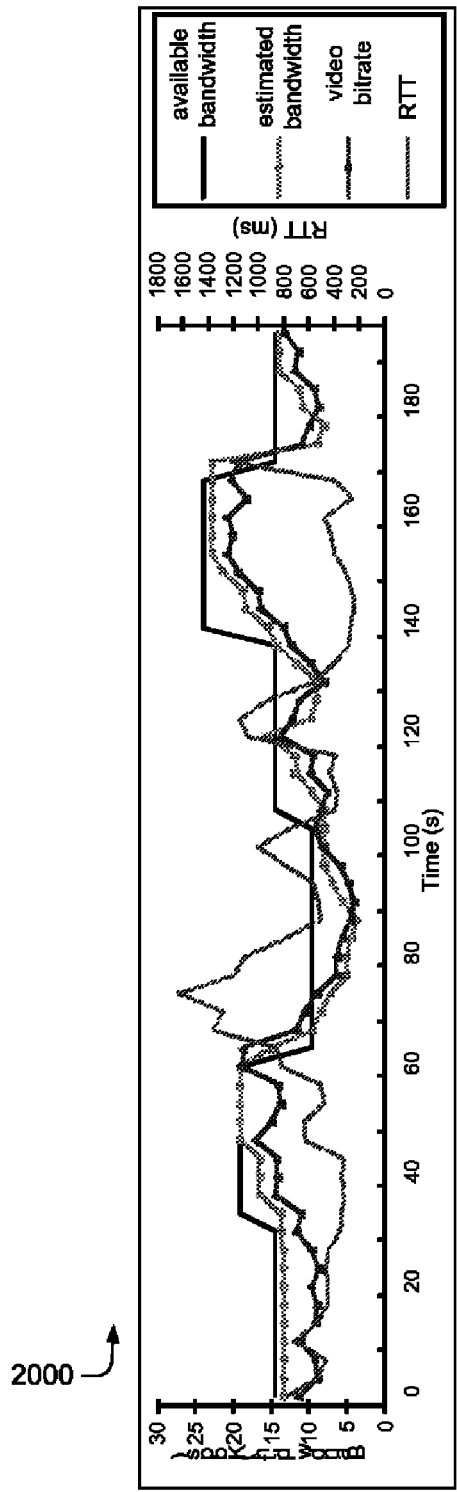
FIG. 20 shows aspects of an exemplary network environment wherein bi-level and full-color video is combined to generate a video stream as a function of bandwidth conditions over time. In particular.

FIG. 20 shows aspects of an exemplary network environment wherein bi-level and full-color video is combined to generate a video stream as a function of bandwidth conditions over time. In particular, the graph illustrates available and estimated bandwidth, video bit rate, and bit rate round-trip-time (RTT) network measurements with respect to time. These network measurements illustrate the substantial effectiveness of the bi-level and full-color video communication combinations of this implementation. For purposes of this example, a conventional network bandwidth emulation tool was used to vary bandwidth of a network from 9.6 Kbps to 24 Kbps. In this implementation, the source video was captured at real-time in the Quarter Common Intermediate Format (QCIF) videoconferencing format at a frame rate of 15 frames-per-second (fps).

As shown in FIG. 20, data values corresponding to available bandwidth are simulated with a conventional network bandwidth emulation tool. The estimated bandwidth data values over time (s) are calculated as described above in section 5.1. The respective video bit rate data values are determined as discussed above with respect to equations (5) through (8). The round-trip-time (RTT) is determined as discussed above with respect to section 5.1, and is representative of network congestion. Note that the calculated estimated bandwidth data values are very close to the available bandwidth, which is a good indicator of the efficiency of the estimated bandwidth algorithm. With analogous indications of efficiency, the video bit rate data values are just underneath the estimated bandwidth data values and very near to both the available and estimated bandwidth data values.

Referring to the 60 second time frame, the bit rate is illustrated as being relatively high, and RTT is shown to increase, which means that the available bandwidth is decreasing (e.g., the network is becoming congested). As a result of the detected bandwidth decrease, the described algorithms decrease the video bit rate as illustrated. Analogously, as available bandwidth increases (e.g., as illustrated by the data values shown between 105 to 145 seconds), estimated bandwidth and actual data throughput increases.

Due to the low bit rate characteristic of bi-level video, not all the available bandwidth may be consumed. For example, after 160 seconds, the available bandwidth may be determined as 24 Kbps, whereas actual throughput may only be around 20 Kbps when estimated bandwidth conditions may have been determined to be close to the network capacity. If network bandwidth capability shrinks, the back-off scheme reduces the throughput rapidly to avoid congestion. The figure shows that for a given bandwidth, our scheme can fit the sending rate to the network capacity.

Figure 21:
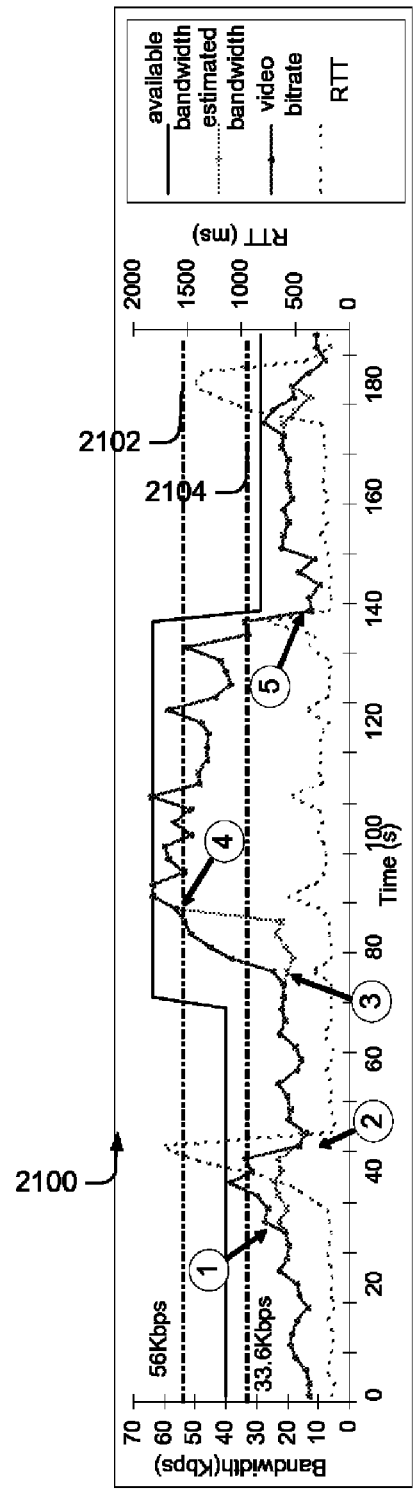
FIG. 21 shows use of probed bandwidth conditions to determine when to switch between bi-level and full-color video communication.

FIG. 21 shows use of probed bandwidth conditions to determine when to switch between bi-level and full-color video communication. In this implementation, and as shown in FIG. 21, the available bandwidth is varied between 40 Kbps, 64 Kbps and 28.8 Kbps respectively. For purposes of illustration of the probing process, a short probing cycle of 30 seconds is utilized. However, in real-time scenarios, the probing cycle will most likely be of longer duration and configured such that the probing operations do not disturb normal network communication processes. In this example, bi-level video is initially encoded such that the bit rate of bi-level video is approximately equal to the actual data throughput of the network (as compared to the total available bandwidth). At time t=30 seconds (s), which is marked with the symbol "1" at the base of an arrow pointing to a corresponding portions of the graph 2100, the probing process starts (performs a first probe operation). The actual sent bit rate (throughput) is larger than the actual bit rate of the video by itself. This is because the amount of transmitted data is increased with redundant data. At point 2, the total throughput reaches the network capacity: note that RTT increases rapidly and exceeds the specified top threshold 2102. The probing stops immediately and no more redundant data is injected into the network.

After waiting for a time period, the probing process restarts (see point 3). This time the total throughput increases gradually because the available bandwidth is sufficient. The switch from bi-level to full-color takes place around 56 Kbps (point 4) and the probing process finishes. After running in full-color video for a while, the system suddenly encounters a bandwidth drop (to 28.8 Kbps in point 5). As a result, the system switches to bi-level video due to large loss rate.

As shown in FIG. 21, the described systems and methods for bi-level and full-color video combination result in video communication that works considerably well across a wide range of network bandwidths. When bandwidth conditions are considered to be too low to support the high-bit rates associated with full-color communication schemes, the described systems and methods decrease image quality and the associated bit rate of the video data stream by communicating bi-level video. Additionally, when bi-level video is being generated and when the evaluated bandwidth conditions indicate that a higher bit rate and quality image that supplied via bi-level video can be supported, the systems and methods increase frame rates and image quality by smoothly transition from the bi-level video to a full-color video communication scheme. In this manner, video data is encoded with a video codec that works best in a suitable bandwidth condition.

An Exemplary Procedure to Combine Bi-Level and Full-Color Encoding

Before continuing the discussion of an exemplary procedure to combine bi-level and full-color video communication schemes with respect to FIGS. 22-26, we first discuss the multiprocessing characteristics of the procedure. In particular, although the operations of the procedure are illustrated in FIGS. 22-26 and discussed in a select order, the processing unit(s) 120 of FIG. 1 in combination with the operating system 134 (FIG. 1) is capable of multiprocessing or pre-emptive operations. Thus, any one of the procedural operations, which are implemented by one or more application programs 135 of FIG. 1, may occur substantially in parallel with any other operation of the procedure as long as any conditions for the operation have been satisfied. For instance, the periodic probing that is initiated by block 2410 of FIG. 24 may occur substantially in parallel with any other operation of the procedure. In view of this, we now discuss the procedure 2200 of FIGS. 22-26 by first referencing the operations of FIG. 22.

Figure 22:
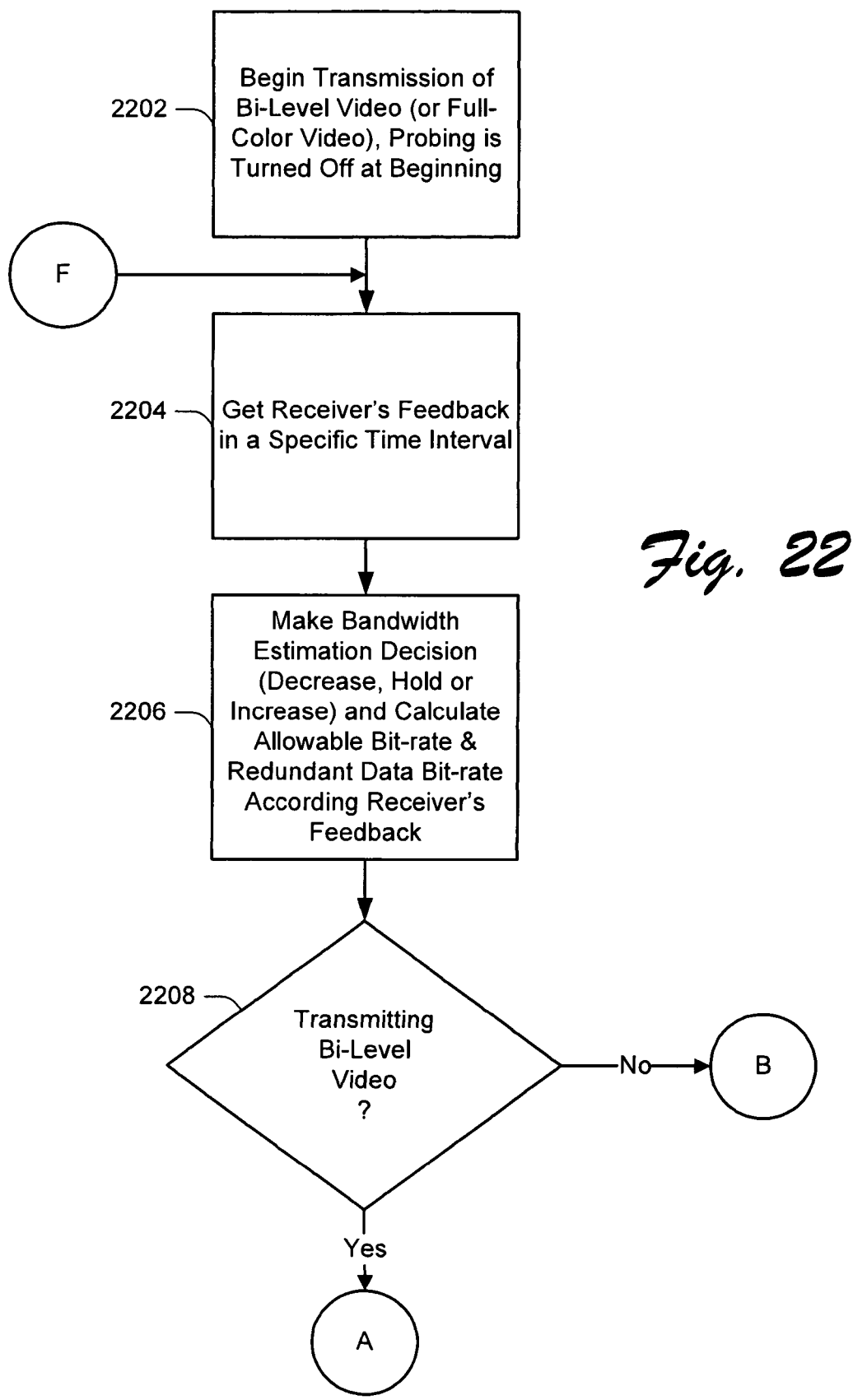
FIG. 22 shows an exemplary procedure to combine bi-color and full-color video for video communication.

FIG. 22 shows an exemplary procedure 2200 to combine bi-color and full-color video for video communication across a wide range of bandwidth conditions. In particular, at block 2202, the procedure begins transmitting a bi-level video data stream across a network (e.g., a network 171 or 173 of FIG. 1) to a recipient (e.g., a remote computer 180). In another implementation, full-color video can first be transmitted to the recipient, rather than first transmitting bi-level video. In this implementation, the recipient includes a bi-level and full-color video decoding computer program application 135 (FIG. 1) to play-back the combined bi-level and full-color video data stream (e.g., program data 137 of FIG. 1). Such video data decoders may be implemented in one or more computer program modules. In another implementation, the recipient may act as a server of the transmitted combination of bi-level and full-color vide to one or more other computers that include such decoders.

At block 2204, the procedure obtains feedback (represented as a portion of program data 137 of FIG. 1) from the receiver. In particular, responsive to receiving the transmitted bi-level video data, the receiver sends information back to the sender (computer 110 of FIG. 1) within a specific time interval. Such information includes, for example, the number of lost packets and timestamps associated with receipt of the bi-level video data from the sender. Subsequent to obtaining feedback from the receiver, at block 2206, the sender estimates the state of the network to make bit-rate adjustment decisions in terms of the network state. Allowable bit rates for video and a redundant data transmission are calculated according to the receiver's feedback. At block 2208, the procedure determines whether bi-level or full-color video is currently being transmitted to the receiver. If so, the procedure continues at block 2302 of FIG. 23, as indicated by on-page reference "A". Otherwise, full-color video is currently being transmitted and the procedure continues at block 2402 of FIG. 24, as discussed below and as indicated by on-page reference "B".

Figure 23:
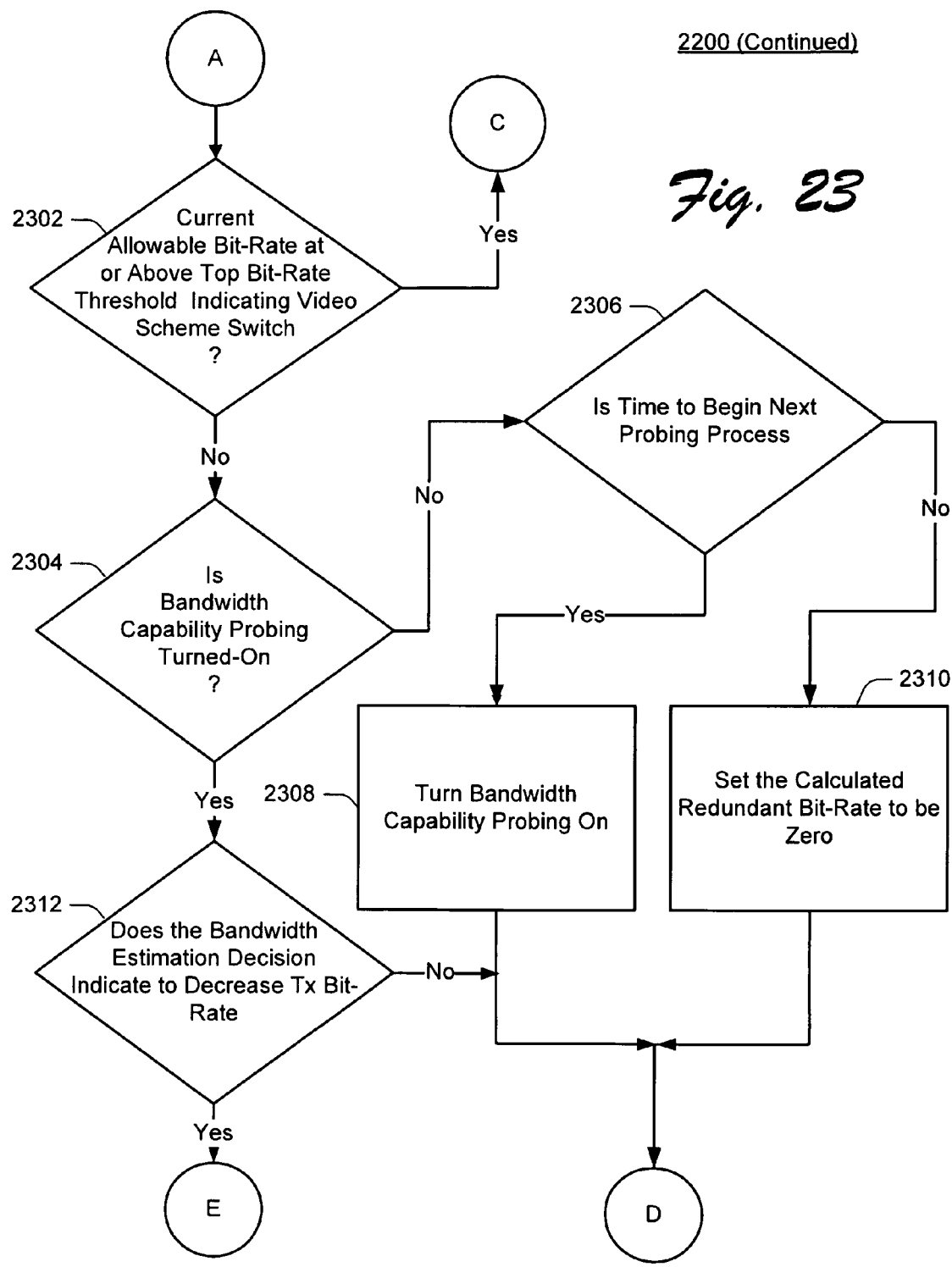

FIG. 23 shows further aspects of the exemplary procedure 2200 to combine bi-color and full-color video for video communication across a wide range of bandwidth conditions. In particular, at block 2302, the procedure 2200 determines whether the allowable bit rate is at or above a top threshold bit rate, the top threshold bit rate having been determined above via network bandwidth estimation for bi-level video transmission. If not, at block 2304 the procedure determines whether bandwidth capability/capacity probing operations have been initiated. Such bandwidth probing operations are used to periodically identify actual data throughput capabilities of the network. Bandwidth capacity probing is only performed when the procedure transmits bi-level video. The goal of bandwidth probing is to check whether the network's capacity is enough to switch to full-color video.

In light of this, at block 2306 the procedure determines whether periodic bandwidth capability probing operations should be turned on. Initially, before any full-color video has been transmitted to the receiver, such probing is turned-on to determine when to switch to full-color video. However, after switching from bi-lever to full-color encoding, the probing process is halted until the video scheme is later switched back to bi-level video (i.e., when the current allowable bit-rate—calculated via equation (5)—is at or below the bottom threshold bit-rate), whereupon the probing process is restarted. In light of this, probing is turned on at block 2308, when appropriate. Otherwise, the redundant data bit rate is set to equal zero (0). At this point, the procedure continues at block 2608 of FIG. 26, as indicated by on-page reference "D".

Returning to block 2304, if bandwidth capability/capacity probing operations have already been initiated, the procedure continues at block 2312, wherein it is determined whether the bandwidth estimation decision indicates to decrease the transmission bit rate. If so, the procedure continues at block 2608 of FIG. 26, as indicated by on-page reference "D". If not, the procedure continues at discussed below at block 2602 of FIG. 26, as indicated by on-page reference "E". And, returning to block 2302, if the conditions of this block are met, the procedure continues at block 2402 of FIG. 24, as indicated by on-page reference "C".

Figure 24:
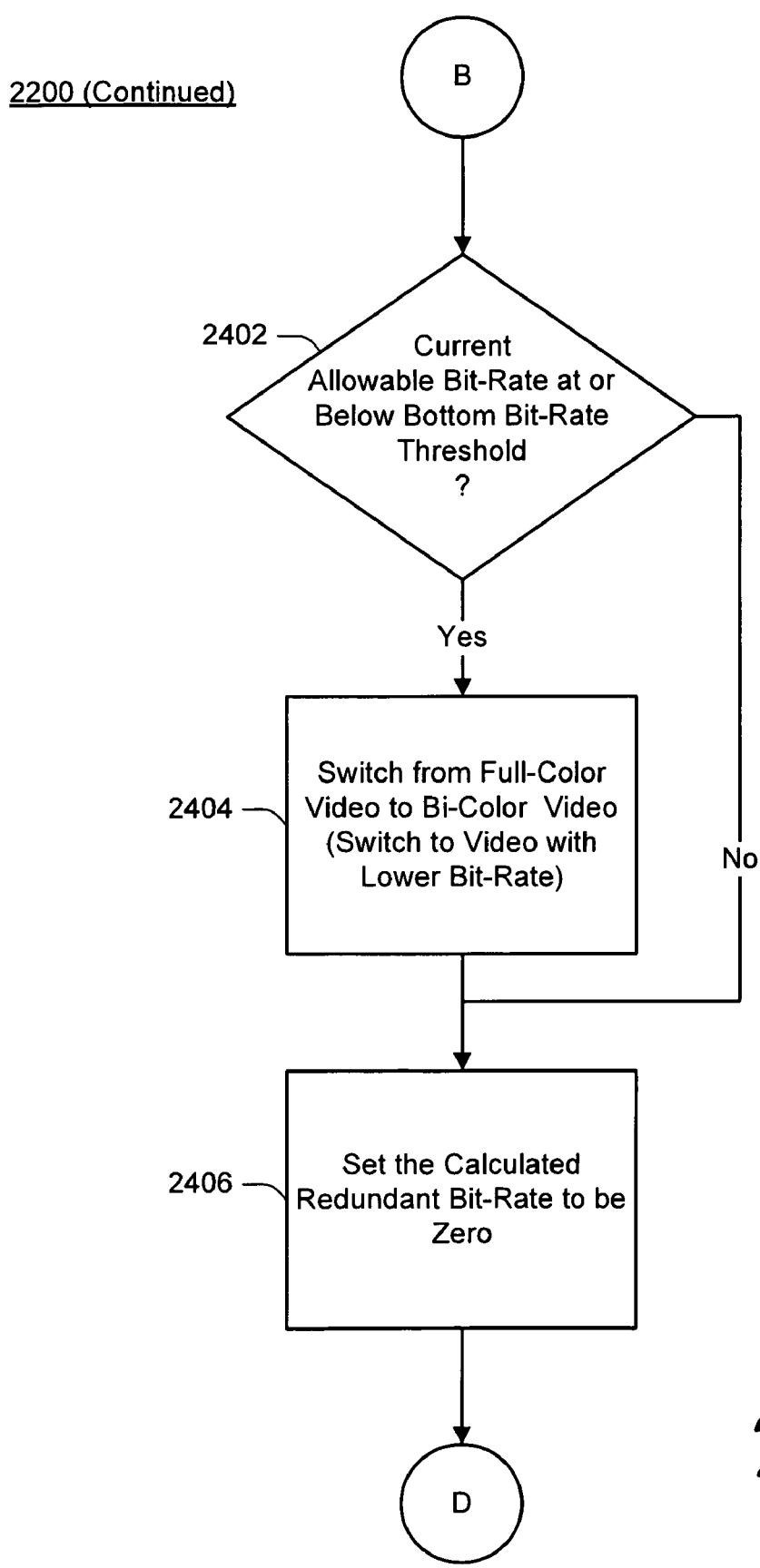
FIG. 24 shows further aspects of the exemplary procedure of FIG. 22 to combine bi-color and full-color video for video communication. In particular.

FIG. 24 shows further aspects of the exemplary procedure 2200 to combine bi-color and full-color video for video communication across a wide range of bandwidth conditions. In particular, FIG. 24 is a continuation of the procedure of FIG. 22, block 2208. At block 2402, the procedure determines if the current allowable bit rate is at or below a bottom bit rate threshold (determined via the bandwidth estimation operations of block 2206 of FIG. 22). If not, the procedure continues at block 2406 as discussed below. Otherwise, at block 2404, the procedure switches from full-color encoding to bi-color encoding to send video data that is more appropriate/suitable for the current bandwidth conditions. At block 2406, the calculated redundant bit-rate used to determine allowable bit-rates is set to zero (0). At this point, the procedure continues at block 2608 of FIG. 26, as described below and as indicated by on-page reference "D".

Figure 25:
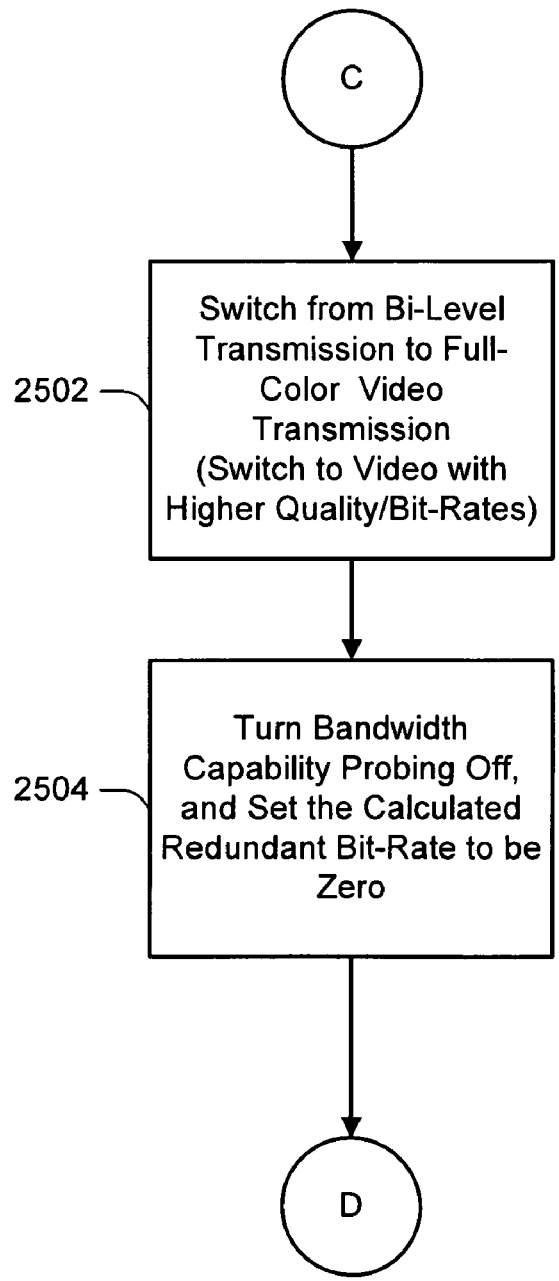
FIG. 25 shows further aspects of the exemplary procedure of FIG. 23 to combine bi-color and full-color video for video communication. In particular.

FIG. 25 shows further aspects of the exemplary procedure 2200 to combine bi-color and full-color video for video communication across a wide range of bandwidth conditions. In particular, FIG. 25 is a continuation of the procedure of FIG. 23, block 2302, as indicated by on-page reference "C". At block 2502, the procedure switches from bi-color transmission to full-color video transmission. At block 2504, the bandwidth capability probing operations are turned off and the calculated redundant bit-rate is set to zero (0). The procedure continues at block 2608 of FIG. 26, as described below and as indicated by on-page reference "D".

Figure 26:
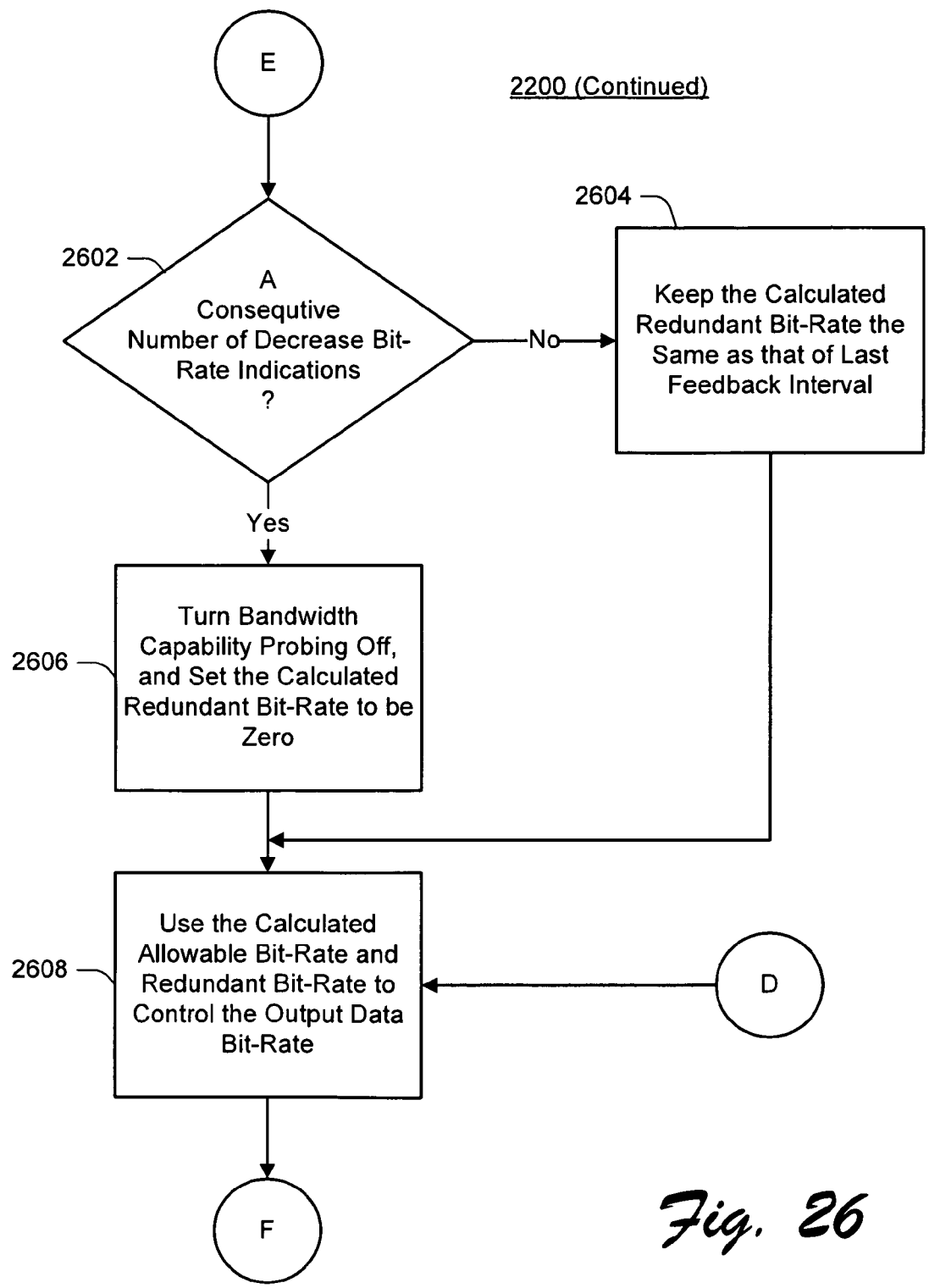
FIG. 26 shows further aspects of the exemplary procedure of FIG. 23 to combine bi-color and full-color video for video communication. In particular.

FIG. 26 shows further aspects of the exemplary procedure 2200 to combine bi-color and full-color video for video communication across a wide range of bandwidth conditions. In particular, FIG. 26 is a continuation of FIGS. 23 and 25, as indicated by respective on-page references "E" and "D", and feeds back into the operations of FIG. 22, as indicated by on-page reference "F". At block 2602, the procedure evaluates whether one or more consecutive decisions was/were made to decrease the transmission bit rate. If not, at block 2604 the procedure keeps the calculated redundant data transmission bit rate the same as that of a last receiver feedback interval (see, block 2204 of FIG. 22). At this point, the procedure continues at block 2608, as described below.

Returning to the decision of block 2602, if one or more consecutive decisions was/were made to decrease the transmission bit rate, block 2606 of the procedure stops the bandwidth capability probing operations. In this implementation, the number of consecutive decrease decisions is two (2). This prevents the video communication and probing operations from being unnecessarily disturbed by random network conditions fluctuation/changes that should be non-determinative to the probing process. In a different implementation, the number of consecutive decrease decisions may be different, and/or may rely on criteria other than being "consecutive.

At block 2608, the procedure uses the calculated allowable bit rate to control the output data bit rate.

In this manner, the procedure 2200 of FIGS. 22-26 combines bi-level and full-color video for robust video communication over a wide range of network bandwidth conditions.

CONCLUSION

The described systems and methods combine bi-level and full-color video as a function of estimated and probed bandwidth conditions for video communication over a wide range of bandwidth conditions. Although the systems and methods have been described in language specific to structural features and methodological operations, the subject matter as defined in the appended claims are not necessarily limited to the specific features or operations described. Rather, the specific features and operations are disclosed as exemplary forms of implementing the claimed subject matter.

For example, the described systems and methods switch from one bi-color to/from full color video as a function of estimated and probed bandwidth conditions. However, in other implementation(s), the described systems and methods can be used to combine other combinations of video as a function of estimated and probed bandwidth conditions that pertain to the utilized video combinations. Such other video combinations include any combination of bi-level, full-color, other color depth video types (e.g., 16-bit, etc.), gray-scale (e.g., 4-bit 8-bit 16-bit, etc.), sketch video, and so on.

The invention claimed is:

1. A method to for video communication, the method comprising operations for:
   estimating bandwidth conditions of a network to determine a suitable target bit rate at which to transmit bi-level and full-color video;
   transmitting bi-level or full-color video over the network at a transmission bit rate, the transmission bit rate being a function of the bandwidth conditions;
   periodically probing bandwidth capability of the network to identify similar, additional, or decreased bandwidth availability as compared to estimated bandwidth conditions, wherein periodically probing bandwidth capability of the network further comprises sending redundant data and bi-level or full-color video data across the network at the transmission bit rate;
   responsive to the probing operation, holding, decreasing, or increasing the transmission bit rate, the increasing and decreasing operations respectively targeting an upper or lower bit rate indicated by the bandwidth conditions; and
   switching from bi-level to full-color video transmission, or vice versa, as a function of when the transmission bit rate respectively reaches the upper bit rate or the lower bit rate.

2. A method as recited in claim 1, wherein the full-color video has a color depth of 24 bits.

3. A method as recited in claim 1, wherein estimating bandwidth conditions is a function of packet loss rate and data round-trip-time (RTT) determinations.

4. A method as recited in claim 1, wherein estimating bandwidth conditions consider a lower threshold of packet loss, an upper threshold to indicate congestion if damage done to video quality resulting from packet loss is substantially large, a maximum transmission bit rate that indicates when delay of video will not be easily perceived during video playback, and a loaded zone associated with a hold bit rate decision that is large enough to avoid frequent switching oscillations between bi-level to/from full-color video.

5. A method as recited in claim 1, wherein transmitting further comprises initially transmitting bi-color video.

6. A method as recited in claim 1, wherein estimating further comprises:
   calculating a threshold band to indicate congested, loaded, and unloaded states of the network; and
   mapping hold, decrease, and increase transmission bit rate decisions to corresponding ones of the congested, loaded, and unloaded states of the network.

7. A method as recited in claim 1, wherein periodically probing bandwidth capability of the network further comprises sending redundant data and bi-level or full-color video data across the network to determine any increase or decrease in bandwidth capability of the network.

8. A method as recited in claim 1 wherein the method further comprises:
   identifying a consecutive number of probing operations that result in a decision to decrease the transmission bit rate; and
   responsive to the identifying, stopping operations of periodically probing such that no redundant data is being transmitted across the network and such that the transmission bit rate is only associated with a bi-level or full-color video transmission bit rate.

9. A method as recited in claim 8, wherein the consecutive number of probing operations is two (2).

10. A storage device comprising at least one of removable or non-removable media having stored thereon computer-program instructions for video communication, the computer-program instructions being executable by a processor and comprising instructions for:
    estimating bandwidth conditions of a network to estimate network states at which to transmit bi-level and full-color video;
    transmitting bi-level or full-color video over the network at a transmission bit rate, the transmission bit rate being a function of the bandwidth conditions;
    periodically probing bandwidth capability of the network to identify similar, additional, or decreased bandwidth availability as compared to estimated bandwidth conditions, wherein the instructions for periodically probing bandwidth capability of the network further comprise instructions for sending redundant data and bi-level or full-color video data across the network at the transmission bit rate;
    responsive to the probing operation, holding, decreasing, or increasing the transmission bit rate, the increasing and decreasing operations respectively targeting an upper or lower bit rate indicated by the bandwidth conditions; and
    switching from bi-level to full-color video transmission, or vice versa, as a function of when the transmission bit rate respectively reaches the upper bit rate or the lower bit rate.

11. A storage device as recited in claim 10, wherein the full-color video has a color depth of 24 bits.

12. A storage device as recited in claim 10, wherein the instructions for estimating bandwidth conditions consider a lower threshold of packet loss, an upper threshold to indicate congestion if damage done to video quality resulting from packet loss is substantially large, a maximum transmission bit rate that indicates when delay of video will not be easily perceived during video playback, and a loaded zone associated with a hold bit rate decision that is large enough to avoid frequent switching oscillations between bi-level to/from full-color video.

13. A storage device as recited in claim 10, wherein the instructions for estimating bandwidth conditions further comprise instructions for determining bandwidth conditions as a function of packet loss rate and data round-trip-time (RTT) determinations.

14. A storage device as recited in claim 10, wherein the instructions for transmitting further comprise instructions for initially transmitting bi-color video.

15. A storage device as recited in claim 10, wherein the instructions for estimating bandwidth conditions further comprise instructions for:
    calculating a threshold band to indicate congested, loaded, and unloaded states of the network; and
    mapping hold, decrease, and increase transmission bit rate decisions to corresponding ones of the congested, loaded, and unloaded states of the network.

16. A storage device as recited in claim 10, wherein the instructions for periodically probing bandwidth capability of the network further comprises sending redundant data and bi-level or full-color video data across the network to determine any increase or decrease in bandwidth capability of the network.

17. A storage device as recited in claim 10, wherein the computer-program instructions further comprise instructions for:
- identifying a consecutive number of probing operations that result in a decision to decrease the transmission bit rate; and
- responsive to the identifying, stopping operations of periodically probing such that no redundant data is being transmitted across the network and such that the transmission bit rate is only associated with a bi-level or full-color video transmission bit rate.

18. A storage device as recited in claim 17, wherein the consecutive number of probing operations is two (2).

19. A computing device for video communication, the computing device comprising:
- a processor; and
- a memory coupled to the processor, the memory comprising computer-program instructions executable by the processor, the computer-program instructions comprising instructions for:
- estimating bandwidth conditions of a network;
- transmitting bi-level or full-color video over the network at a transmission bit rate, the transmission bit rate being a function of the bandwidth conditions;
- periodically probing bandwidth capability of the network to identify similar, additional, or decreased bandwidth availability as compared to estimated bandwidth conditions, wherein the instructions for periodically probing bandwidth capability of the network further comprise instructions for sending redundant data and bi-level or full-color video data across the network at the transmission bit rate;
- responsive to the probing operation, holding, decreasing, or increasing the transmission bit rate, the increasing and decreasing operations respectively targeting an upper or lower bit rate indicated by the bandwidth conditions; and
- switching from bi-level to full-color video transmission, or vice versa, as a function of when the transmission bit rate respectively reaches the upper bit rate or the lower bit rate.

20. A computing device as recited in claim 19, wherein the full-color video has a color depth of 24 bits.

21. A computing device as recited in claim 19, wherein the instructions for estimating bandwidth conditions further comprise instructions for determining bandwidth conditions as a function of packet loss rate and data round-trip-time (RTT) determinations.

22. A computing device as recited in claim 19, wherein the instructions for transmitting further comprise instructions for initially transmitting bi-color video.

23. A computing device as recited in claim 19, wherein the instructions for estimating further comprise instructions for:
- calculating a threshold band to indicate congested, loaded, and unloaded states of the network; and
- mapping hold, decrease, and increase transmission bit rate decisions to corresponding ones of the congested, loaded, and unloaded states of the network.

24. A computing device as recited in claim 19, wherein the instructions for periodically probing bandwidth capability of the network further comprises sending redundant data and bi-level or full-color video data across the network to determine any increase or decrease in bandwidth capability of the network.

25. A computing device as recited in claim 19, wherein the computer-program instructions further comprise instructions for:
- identifying a consecutive number of probing operations that result in a decision to decrease the transmission bit rate; and
- responsive to the identifying, stopping operations of periodically probing such that no redundant data is being transmitted across the network and such that the transmission bit rate is only associated with a bi-level or full-color video transmission bit rate.

26. A computing device as recited in claim 25, wherein the consecutive number of probing operations is two (2).

* * * * *